(12) United States Patent
Hayashi et al.

(10) Patent No.: US 12,440,955 B2
(45) Date of Patent: Oct. 14, 2025

(54) POWER TOOL AND POWER TOOL SYSTEM

(71) Applicant: MAKITA CORPORATION, Anjo (JP)

(72) Inventors: Takumi Hayashi, Anjo (JP); Fumitoshi Numata, Anjo (JP); Koichi Yakabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/598,190

(22) Filed: Mar. 7, 2024

(65) Prior Publication Data
US 2024/0326223 A1 Oct. 3, 2024

(30) Foreign Application Priority Data
Apr. 3, 2023 (JP) ................................. 2023-060298

(51) Int. Cl.
*B25F 5/02* (2006.01)
*B25B 29/00* (2006.01)
*G06N 20/00* (2019.01)

(52) U.S. Cl.
CPC ............... *B25F 5/02* (2013.01); *B25B 29/00* (2013.01); *G06N 20/00* (2019.01)

(58) Field of Classification Search
None
See application file for complete search history.

(56) References Cited

U.S. PATENT DOCUMENTS

| 6,520,270 B2 * | 2/2003 | Wissmach | B25F 5/003 173/4 |
| 9,114,494 B1 * | 8/2015 | Mah | B25H 1/0092 |
| 2012/0162406 A1 * | 6/2012 | Schmidt | B23B 49/00 348/95 |
| 2014/0240125 A1 * | 8/2014 | Burch | B25H 3/02 340/539.13 |
| 2019/0294138 A1 | 9/2019 | Dobashi et al. | |

FOREIGN PATENT DOCUMENTS

JP 2018108633 A 7/2018

* cited by examiner

*Primary Examiner* — Nathaniel C Chukwurah
(74) *Attorney, Agent, or Firm* — J-TEK LAW PLLC; Jeffrey D. Tekanic; Scott T. Wakeman

(57) ABSTRACT

A power tool is configured such that at least one accessory is mountable in a detachable manner. The power tool includes at least one camera and a determining part. The at least one accessory may be an auxiliary handle and/or a cover, which at least partially covers a tool accessory mounted on the power tool in a detachable manner. The determining part is configured to perform image processing on image data output from the at least one camera and to determine whether the state of the at least one accessory is normal based on at least whether the at least one accessory is mounted on the power tool.

20 Claims, 15 Drawing Sheets

POWER TOOL AND POWER TOOL SYSTEM

CROSS-REFERENCE TO RELATED APPLICATION

This application claims priority to Japanese patent application no. 2023-060298 filed on Apr. 3, 2023, the contents of which are fully incorporated herein by reference.

TECHNICAL FIELD

The present disclosure relates to a power tool, on which an accessory is mountable in a detachable manner, and a power tool system, which comprises the power tool on which the accessory is mountable in a detachable manner. More particularly, the power tool or power tool system includes an AI unit that determines whether the power tool or power tool system is in a normal state or an abnormal state.

BACKGROUND ART

A known power tool uses image data of an image captured by a camera to identify a work object and perform a process thereon. For example, in Japanese Laid-open Patent Publication No. 2018-108633 and its family member US 2019-0294138, a portable tool is disclosed that, based on the result of comparing an image captured by a camera and a reference image, can identify a work object, from among multiple work objects that appear in the captured image, as the work object set by a tool.

SUMMARY

With regard to the power tool described above, the result of identifying the work object is used in a subsequent process. Nevertheless, there is room for further use of the captured image obtained by the camera.

One non-limiting object of the present disclosure is to provide an improvement concerning the use of a camera in a power tool.

According to one non-limiting aspect of the present disclosure, a power tool is provided on which at least one accessory is mountable in a detachable manner. The power tool comprises at least one camera and a determining part (e.g., a processor or other semiconductor based arithmetic calculation device, such as an artificial intelligence (AI) unit). The at least one accessory of the present aspect may be an auxiliary handle and/or a cover, which at least partially covers a tool accessory mounted on the power tool. The determining part is configured to perform image processing on image data output from the at least one camera and to determine whether the state of the at least one accessory is normal based on at least whether the at least one accessory is mounted (e.g., properly mounted) on the power tool.

It is noted that the term "accessory" is intended to encompass devices and apparatuses that are detachably mountable, e.g., in either a supplemental or auxiliary manner (such as auxiliary handles) or in a required manner (e.g., a grinding wheel cover), on the power tool and are used together with the power tool. For example, so-called rotary tools that rotationally drive a tool accessory around a drive axis (e.g., grinders) and drill tools (e.g., hammer drills and driver-drills) are examples of a power tool on which an auxiliary handle is mountable. In addition, for example, wheel covers (also called wheel guards) for disk-shaped tool accessories (e.g., grinding wheels, rubber pads, brushes, and blades) mounted on grinders, and dust-collecting attachments for elongate-shaped tool accessories mounted on hammers and hammer drills can be given as examples of a cover.

Among accessories mountable on a power tool, auxiliary handles, covers configured to at least partially cover the tool accessory, and the like can have a great impact on the work environment, depending on whether they are mounted on the power tool. The determining part of the power tool according to the present aspect uses image data of an image captured by at least one camera to determine whether the state of the auxiliary handle and/or the state of the cover are normal based on at least whether the auxiliary handle and/or the cover is/are mounted. Thereby, it becomes possible to use the determination results in an appropriate subsequent process (e.g., motor control, reporting of information to a user, etc.).

According to another non-limiting aspect of the present disclosure, a power tool system comprising a power tool and a determining part are provided. The power tool is configured such that at least one accessory is mountable in a detachable manner. In addition, the power tool comprises at least one camera. The determining part is configured to infer the state of the at least one accessory and determine whether the state of the at least one accessory is normal by inputting, into a trained model obtained by machine learning (AI model training), image data of an image captured by the at least one camera. It is noted that, in the present aspect, the determining part may be provided on the power tool. Alternatively, the determining part may be provided on an external apparatus that is separate from the power tool. The power tool and the external apparatus may be connected to each other via a network or may be directly connected to each other wirelessly (e.g., via Bluetooth® or another wireless communication standard) or by wire(s).

The determining part of the power tool system according to the present aspect uses image data of an image captured by at least one camera to determine whether the state of the auxiliary handle and/or the state of the cover is/are normal based on at least whether the auxiliary handle and/or the cover are mounted. Thereby, it becomes possible to use the determination results in an appropriate subsequent process (e.g., motor control, reporting of information to the user, etc.).

DETAILED DESCRIPTION

Figure 1:
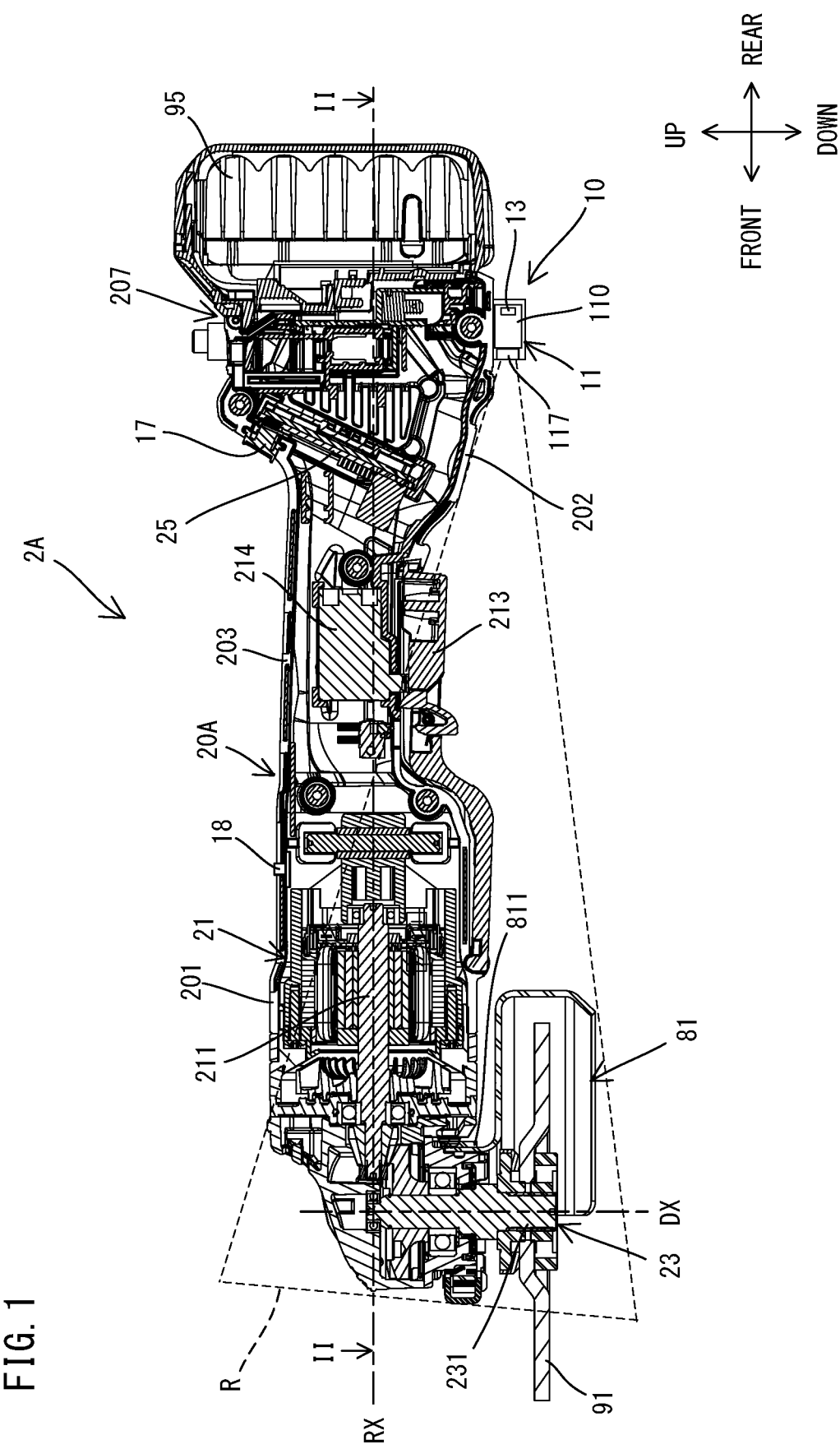
FIG. 1 is a cross-sectional view of a grinder according to a first embodiment of the present disclosure.

In one non-limiting embodiment of the present disclosure, the determining part may be configured to infer the state of the at least one accessory by inputting the image data into a trained model obtained by machine learning and to determine whether the state of the at least one accessory is normal. According to this embodiment, by generating the trained model in advance using appropriate machine learning, it becomes possible to determine, with high accuracy, whether the state of the auxiliary handle and/or the state of the cover is/are normal. It is noted that the trained model generated by machine learning may be generated in advance by machine learning in a power tool. Alternatively, the trained model generated by machine learning can be generated by an external apparatus that is different from the power tool and, for example, is stored in memory or a storage device of the power tool.

In addition to the above-mentioned embodiment or instead of the above-mentioned embodiment: the determining part may be one or more processors; the processor(s) together with memory, which stores the trained model, may be constituted on one chip or a plurality of chips. According to this embodiment, an inference function that uses the trained model can be added to the power tool easily.

In addition to the above-mentioned embodiments or instead of the above-mentioned embodiments, the power tool may comprise a tool main body, a motor, a manipulatable member, a main switch, and a control part. The motor may be housed in the tool main body. The manipulatable member may be configured to be manually operated by a user. The main switch may be configured to turn ON in response to manual manipulation of the manipulatable member. The control part may be configured to control the operation of the power tool based on the state of the main switch and a determination result of the determining part. The control part may be configured to start the drive of the motor only when the main switch is ON and the determining part has determined that the state of the at least one accessory is normal. According to this embodiment, the possibility that the drive of the motor will be started, in a state in which the auxiliary handle and/or the cover is/are not properly mounted (i.e. an abnormal state), can be reduced. It is noted that, in an embodiment in which both the auxiliary handle and the cover are to be mounted on the power tool, the control part may be configured to start the drive of the motor only when the control part has determined that the main switch is ON and the determining part has determined that both the state of the auxiliary handle and the state of the cover are normal.

In addition to the above-mentioned embodiments or instead of the above-mentioned embodiments, the determining part may be configured to periodically determine, during drive of the motor, whether the state of the at least one accessory is normal. The control part may be configured to stop the drive of the motor or reduce the rotational speed of the motor during the drive of the motor in response to the determining part having determined that the state (mounting state) of the auxiliary handle and/or the state (mounting state) of the cover is/are not normal. According to this embodiment, in the situation in which the state of the auxiliary handle and/or the state of the cover has/have become not normal after having started driving the motor, the drive of the motor can be stopped promptly.

In addition to the above-mentioned embodiments or instead of the above-mentioned embodiments, the determining part and the control part may be separate processors that are wire connected or wirelessly connected (e.g., via Bluetooth® or another wireless communication standard) to each other. According to this embodiment, because it is not necessary for the control part to perform image processing, the processing load on the control part can be made smaller.

In addition to the above-mentioned embodiments or instead of the above-mentioned embodiments, the power tool may further comprise a reporting unit configured to report information indicating an abnormal state or malfunctioning state in response to the determining part having determined that the state of the at least one accessory is not normal. According to this embodiment, the user can recognize that the auxiliary handle and/or the cover are not in the normal state and can take necessary corrective measures. It is noted that the form of the information reported by the reporting unit is not particularly limited; for example, the report of information can be made by sound, light, an image, tactile (vibration) or the like. In accordance with the form of the information, the reporting unit can be embodied as, for example, a buzzer, a speaker, a light-emitting device (e.g., an LED), a display, or the like.

In addition to the above-mentioned embodiments or instead of the above-mentioned embodiments, the power tool may comprise a detection part configured to detect a prescribed operation of the user. The at least one camera and the determining part may be configured to start in response to the detection part detecting the prescribed operation. According to this embodiment, the electric power consumed by the at least one camera and the determining part can be curtailed. The detection system of the prescribed operation is not particularly limited; for example, it is possible to use a mechanical-type switch having a well-known configuration, or a sensor that is a capacitance type, an optical type, an ultrasonic type, or the like, as the detection part. The prescribed operation performed by the user is, for example, the manipulation (pressing) of a switch, an operation in which a hand approaches a sensor, an operation in which a hand is disposed at a prescribed location, or the like.

In addition to the above-mentioned embodiments or instead of the above-mentioned embodiments, the at least one accessory may be the auxiliary handle. The determining part may be configured to determine that the state of the at least one accessory is normal in response to the determining part determining that the auxiliary handle is mounted on the power tool and the auxiliary handle is being gripped by the user. According to this embodiment, in the situation in which the auxiliary handle is not being gripped by the user even though it is mounted on the power tool (i.e. the power tool is being operated in an unsafe manner), an appropriate process can be performed.

In addition to the above-mentioned embodiments or instead of the above-mentioned embodiments, the at least one camera and the determining part may be connected to each other by wire(s). According to this embodiment, a large volume of image data can be output from the camera to the determining part at a higher speed and more reliably than in an embodiment that utilizes a wireless connection.

In addition to the above-mentioned embodiments or instead of the above-mentioned embodiments, the power tool may further comprise a camera guard, which at least partially covers the at least one camera. According to this embodiment, for example, if the power tool is dropped onto the floor or the ground, the camera guard can protect the at least one camera from the impact.

In addition to the above-mentioned embodiments or instead of the above-mentioned embodiments, the power tool may further comprise a lens hood, which is configured to block light that enters a lens of the at least one camera from one or more specific directions. According to this embodiment, by blocking light from one or more directions that is (are) not preferable or useful, an appropriate image of the auxiliary handle and/or the cover can be captured, e.g., without extraneous or unnecessary image information.

In addition to the above-mentioned embodiments or instead of the above-mentioned embodiments, a plurality of mounting locations, at (on) which the at least one accessory is mountable, may be defined on the power tool. The at least one camera may be only one camera and may be disposed at a location at which it can capture an image of the at least one accessory when the at least one accessory has been mounted at any of the plurality of mounting locations. According to this embodiment, regardless of the usage mode of the auxiliary handle, the state of the auxiliary handle and/or the state of the cover can be determined using the minimum number of cameras.

In addition to the above-mentioned embodiments or instead of the above-mentioned embodiments, the power tool may be a grinder. The grinder may comprise a spindle and a tool main body, which houses the motor and the spindle. The spindle may be configured to be operably coupled to the motor and to be rotated, by the rotational power of the motor, around an axis extending in a direction orthogonal (or substantially orthogonal, e.g., within an angle range of 80-100°) to a rotational axis of the motor. The tool main body may have an elongate shape overall and extend along the rotational axis of the motor. The at least one camera may be disposed on the side opposite the spindle relative to the motor in a longitudinal-axis direction of the tool main body. According to this embodiment, a rational arrangement of the at least one camera is achieved.

In addition to the above-mentioned embodiments or instead of the above-mentioned embodiments, the tool main body may comprise a grip part (or handle) configured to be gripped by the user. The at least one camera may be disposed at a portion of the tool main body other than the grip part. According to this embodiment, the at least one camera is less likely to interfere with the gripping (holding, grasping) of the grip part (main grip) of the tool main body.

In addition to the above-mentioned embodiments or instead of the above-mentioned embodiments, the at least one accessory may include both the auxiliary handle and the cover. The at least one camera may be only one camera and may be disposed at a location at which it can capture an image of both the auxiliary handle and the cover. According to this embodiment, the state of the auxiliary handle and the state of the cover can be determined using the minimum number of cameras.

In addition to the above-mentioned embodiments or instead of the above-mentioned embodiments, the at least one camera may be at a location that is offset from a drive axis of the tool accessory. Generally, the auxiliary handle is mounted on the power tool at a location proximate to the drive axis. In addition, the cover at least partially covers the tool accessory. According to this embodiment, the at least one camera can be disposed at a location at which it is easy to capture an image of the auxiliary handle and/or the cover.

Representative and non-limiting embodiments of the present disclosure will be specifically explained below, with reference to the drawings.

First Embodiment

A power disc grinder 2A (hereinbelow, simply called grinder 2A) according to a first embodiment will be explained below, with reference to FIG. 1 to FIG. 7. The grinder 2A is one representative example of a power tool according to the present disclosure. In greater detail, the grinder 2A is one example of a rotary tool configured to perform processing work (e.g., grinding, abrading, and cutting) by rotationally driving a disk-shaped tool accessory 91 (e.g., a grinding wheel, a rubber pad, a brush, or a blade).

First, the physical configuration of the grinder 2A will be explained.

Figure 2:
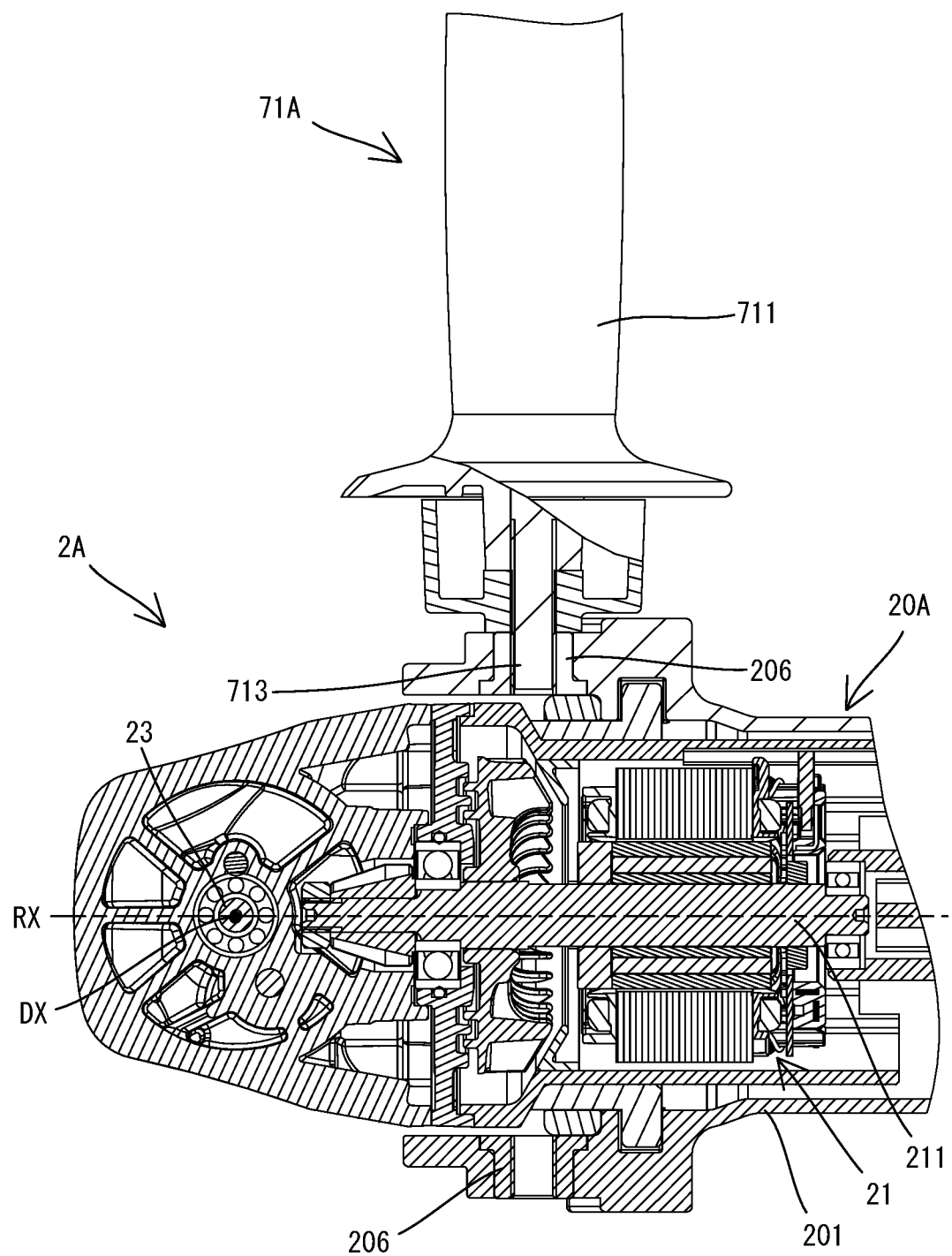
FIG. 2 is a cross-sectional view taken along line II-II in FIG. 1.

As shown in FIG. 1 and FIG. 2, an outer wall of the grinder 2A is formed by a tool main body 20A. The tool main body 20A is configured overall as an elongate-shaped hollow body.

A motor 21 is housed in the tool main body 20A. The motor 21 is disposed such that rotational axis RX of an output shaft 211 thereof extends in the longitudinal-axis direction of the tool main body 20A. A spindle 23 is housed in one-end portion of the tool main body 20A in the longitudinal-axis direction. The spindle 23 is operably coupled to the output shaft 211 of the motor 21 and is configured to be rotationally driven around drive axis DX by the rotational drive of the motor 21.

One-end portion of the spindle 23 in the axial direction protrudes outward from the tool main body 20A. This one-end portion is configured to hold the tool accessory 91 in a detachable manner and is referred to as a tool-mounting part 231. The spindle 23 rotationally drives the tool accessory 91, which is mounted on the tool-mounting part 231, in accordance with the drive of the motor 21.

The other-end portion of the tool main body 20A in the longitudinal-axis direction comprises a battery-mounting part 207 configured to receive (attach) a battery (rechargeable battery pack or cartridge) 95, which is the power supply of the grinder 2A, in a detachable manner. Because this is a well-known structure, detailed explanation and illustration thereof are omitted; the battery-mounting part 207 comprises rails, which are configured to physically engage with corresponding grooves in the battery 95, and terminals, which are configured to electrically connect to (with) corresponding terminals of the battery 95.

It is noted that drive axis DX of the spindle 23 extends in a direction that intersects (in greater detail, a direction that is orthogonal or substantially orthogonal to) rotational axis RX of the output shaft 211. In the explanation below, for the sake of convenience, the extension direction of rotational axis RX of the output shaft 211 (which is also the longitudinal-axis direction of the tool main body 20A) is defined as the front-rear direction of the grinder 2A. In the front-rear direction, the side on which the spindle 23 is disposed is defined as the front side of the grinder 2A, and the opposite side (the side on which the battery-mounting part 207 is disposed) is defined as the rear side of the grinder 2A. In addition, the extension direction of drive axis DX is defined as the up-down direction of the grinder 2A. In the up-down direction, the side on which the tool-mounting part 231 is disposed is defined as the lower side of the grinder 2A, and the opposite side is defined as the upper side of the grinder 2A. The direction orthogonal to the front-rear direction and the up-down direction is defined as the left-front direction of the grinder 2A.

The substantially center portion of the tool main body 20A in the longitudinal-axis direction (front-rear direction) constitutes a grip part 203, which is configured to be gripped (held) by the user. The grip part 203 has a thickness or diameter that makes it easy for the user to comfortably grip and the diameter thereof is smaller than the diameter of a front-end part 201, which houses the motor 21 and the spindle 23, and is smaller than the diameter of a rear-end part 202, which comprises the battery-mounting part 207, of the tool main body 20A. It is noted that because the user can also supplementarily grip at least one accessory 73, such a side handle 71A, which is described below, the grip part 203 of the tool main body 20A can also be called the "main grip" or "main handle".

A trigger 213 (also called a switch lever) is provided on the lower side of the grip part 203. The trigger 213 is a manipulatable member that is pressable when the user is gripping the grip part 203. A main switch 214, which is for starting the motor 21, is disposed inside the grip part 203. The main switch 214 is configured to be normally OFF and to turn ON while the trigger 213 is pressed. The main switch 214 is connected to a controller 25, which is described below. It is noted that, in the present disclosure, electrical or electronic parts being "connected" means that they are electrically and communicatively connected. In addition, except in situations in which "connected by electrical wire (wire connected)" or "wirelessly connected" are noted in particular, it means that it may be either connected by wire(s) or connected wirelessly.

The controller 25 is housed in the rear-end part 202 of the tool main body 20A. The controller 25 is configured to control the operation of the grinder 2A. The details of the controller 25 will be described below.

In addition, the side handle 71A and a wheel cover 81 are mountable on the tool main body 20A in a detachable manner. The side handle 71A and the wheel cover 81 are each one example of a device or an apparatus (i.e. "at least one accessory") that is supplementarily (detachably) mounted on the grinder 2A and used together with the grinder 2A.

The side handle 71A shown in FIG. 2 is a handle that is supplementarily gripped in addition to the grip part 203 (main grip) and also may be called "an auxiliary handle". The side handle 71A enables the user to hold the grinder 2A with both hands, and thereby the user can increase the holding force to counteract the reaction torque generated by the tool main body 20A when, for example, the tool accessory 91 locks up (binds).

The side handle 71A comprises a grip part 711 and a mounting part 713. The grip part 711 is an elongate-shaped portion and is configured to be gripped by the user. The mounting part 713 is a portion that protrudes from one-end portion of the grip part 711 and is configured to be mounted on (fixed by being coupled to) the tool main body 20A. The mounting part 713 of the present embodiment is configured as a male-thread portion. In contrast, handle-mounting parts 206, which are configured as female-thread portions to which the mounting part 713 (male-thread portion) can be fastened, are provided on the front-end part 201 of the tool main body 20A. It is noted that, in the present embodiment, the handle-mounting parts 206 of the tool main body 20A are provided on a left-side portion and a right-side portion, respectively. The user can use the side handle 71A by mounting it on either of the two (i.e. left or right) handle-mounting parts 206 in accordance with their handedness, the work environment, or the like. When the side handle 71A is mounted on the tool main body 20A, the grip part 711 protrudes leftward or rightward from the tool main body 20A.

The wheel cover 81, which is also called a wheel guard, shown in FIG. 1 blocks or shields the scattering of debris, dust and the like from the work material produced by the processing work and also protects or shields the user from the rotating tool accessory 91. Because this is a well-known structure, detailed explanation and illustration thereof are omitted; a mounting part 811 of the wheel cover 81 is mountable, by a screw or a clamp lever in a detachable manner, around a lower-end portion of the front-end part 201 of the tool main body 20A. When the wheel cover 81 is mounted on the tool main body 20A, the wheel cover 81 partially covers the tool-mounting part 231 of the spindle 23 and the tool accessory 91.

The grinder 2A of the present embodiment is configured to infer (determine) the state (mounting state) of the side handle 71A and the state (mounting state) of the wheel cover 81 and, in accordance with the inference results (determination results), to control the operation of the grinder 2A. Consequently, an artificial intelligence unit (hereinafter, simply "AI unit") 10 is provided on the grinder 2A of the present embodiment.

As shown in FIG. 1, the AI unit 10 of the present embodiment comprises a (at least one) camera 11 and an (at least one) inference chip 13, which is configured to infer the state of the side handle 71A and the state of the wheel cover 81 based on image data output from the camera 11.

Figure 3:
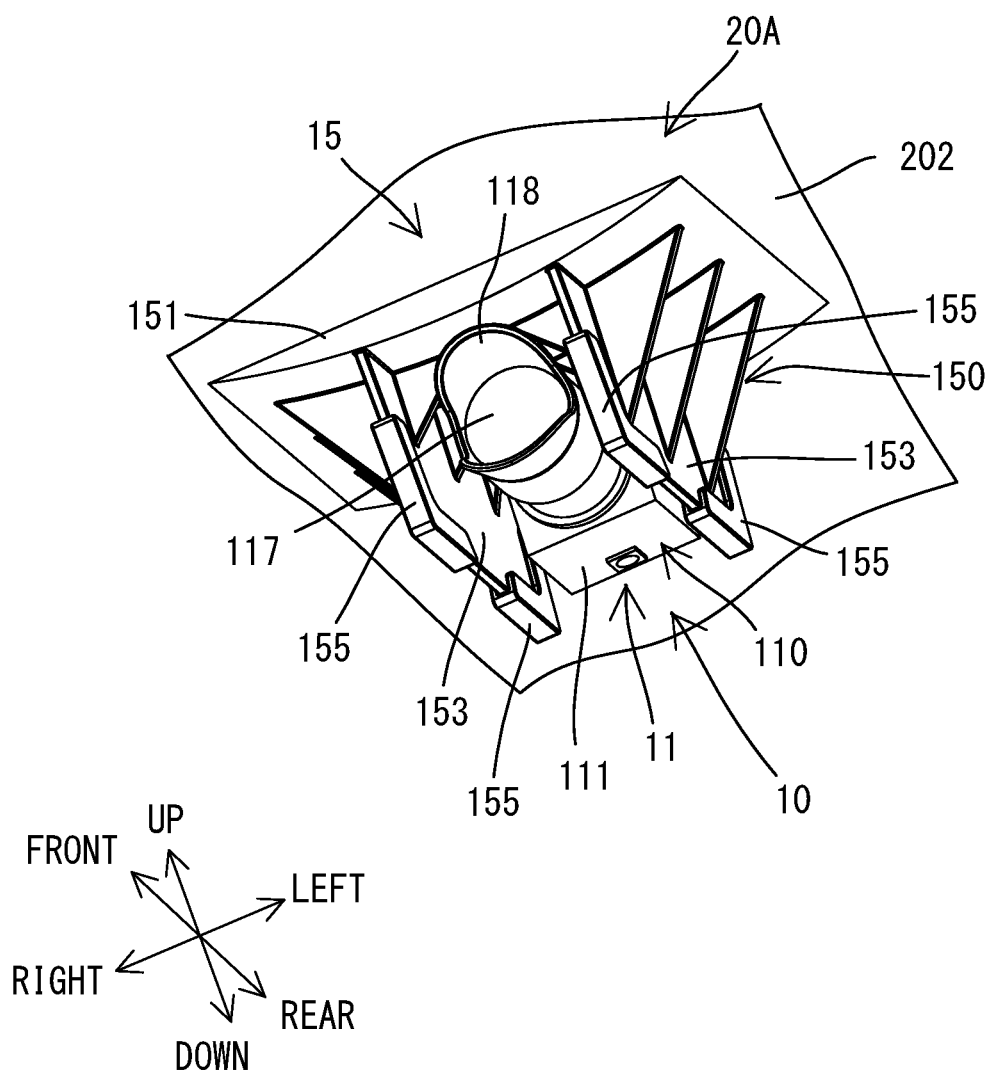
FIG. 3 is an oblique view of a camera (AI unit) that is mounted on a tool main body via a camera guard.

As shown in FIG. 3, the camera 11 comprises a lens 117 and a camera main body 110. The camera main body 110 comprises a main-body case 111 and an image-capturing device 113 (refer to FIG. 4), which is housed in the main-body case 111. The image-capturing device 113 converts light, which is from an object whose image was captured and which has entered via the lens 117, into an electrical signal and outputs such as image data. It is noted that the type of the image-capturing device 113 is not particularly limited; for example, a CCD (charge-coupled device) or a CMOS (complementary metal-oxide-semiconductor) chip can be used as the image-capturing device 113.

Although the details are described below, in the present embodiment, the operation of the grinder 2A is controlled in accordance with: whether the side handle 71A is mounted on either one of the handle-mounting parts 206 of the tool main body 20A and is being gripped by the user; and whether the wheel cover 81 is mounted. Consequently, image data of the image captured by the camera 11 is used. Thereby, it is preferable that the camera 11 can simultaneously and individually capture: (i) at least a portion of the side handle 71A mounted on the tool main body 20A; (ii) at least a portion of the hand that grips the grip part 711; and (iii) at least a portion of the wheel cover 81 mounted on the tool main body 20A. It is noted that the tool main body 20A, the side handle 71A mounted on the tool main body 20A, the user's hand that grips the grip part 711, and the wheel cover 81 mounted on the tool main body 20A are each also called an object below.

As shown in FIG. 1, in the present embodiment, the camera 11 (in greater detail, the AI unit 10 comprising the camera 11) is mounted, such that the lens 117 of the camera 11 faces forward, on a lower surface of the rear-end part 202 of the tool main body 20A, that is, the lower surface of a portion of the tool main body 20A that is more rearward than the grip part 203. In greater detail, the camera 11 is mounted on a lower surface of the battery-mounting part 207, which is at the rear end of the rear-end part 202.

The battery-mounting part 207 is located on the most-rear end of the rear-end part 202, that is, most spaced apart from the side handle 71A and the wheel cover 81 in the front-rear direction. In addition, the lower end of the battery-mounting part 207 is located most downward at the rear-end part 202 of the tool main body 20A. Thereby, by mounting the camera 11 on the lower side of the battery-mounting part 207, the object can fit in the image-capturing range R of the camera 11 without using a lens that is particularly wide angle. In addition, as described above, the diameter of the grip part 203 is smaller than other portions, and the rear-end part 202 protrudes more downward than the grip part 203. Thereby, even when the user is gripping the grip part 203 with the hand other than their hand with which they are gripping the side handle 71A, that hand does not interfere with capturing an image of the object.

As shown in FIG. 3, in the state in which the camera 11 (AI unit 10) is supported on a camera guard 15, the camera 11 is fixed to the tool main body 20A. The camera guard 15 comprises a frame 150, which supports the camera 11, and elastic bodies 155, which are mounted on the frame 150. The frame 150 comprises a rectangular-shaped mounting plate 151, which is mounted on the tool main body 20A by, for example, a screw, and two rectangular-plate-shaped side plates 153, which protrude downward from the mounting plate 151. The elastic bodies 155 are mounted on the side plates 153 so as to cover the two corners at the lower end of each of the side plates 153. The elastic bodies 155 should be members that are capable of absorbing impacts; for example, rubber or a foam body (e.g., an elastomer) made of a synthetic resin (polymer) can be used.

The camera 11 is supported on the frame 150 in the state in which the camera 11 is surrounded by the mounting plate 151 and the side plates 153 from above, the left, and the right. The camera 11 does not protrude from the frame 150 in any direction, neither the front-rear direction, the up-down direction, nor the left-right direction. Thereby, if the grinder 2A drops onto the floor or the ground, the camera guard 15, not the camera 11, will impact the floor or the ground first. Thereby, the potential for breakage of the camera 11 can be reduced. In addition, the elastic bodies 155, which are mounted on the frame 150, can absorb the impact effectively.

In addition, a lens hood 118 is mounted on the lens 117. The lens hood 118 is configured to at least partially block light that could adversely affect the capturing of an image of the object by the camera 11 (light from one or more directions other than from the image-capturing range R of the camera 11). In the present embodiment, the lens hood 118 protrudes forward from upward and downward of the lens 117 and can obstruct the light from upward and downward of the lens 117 from entering the lens 117.

Figure 4:
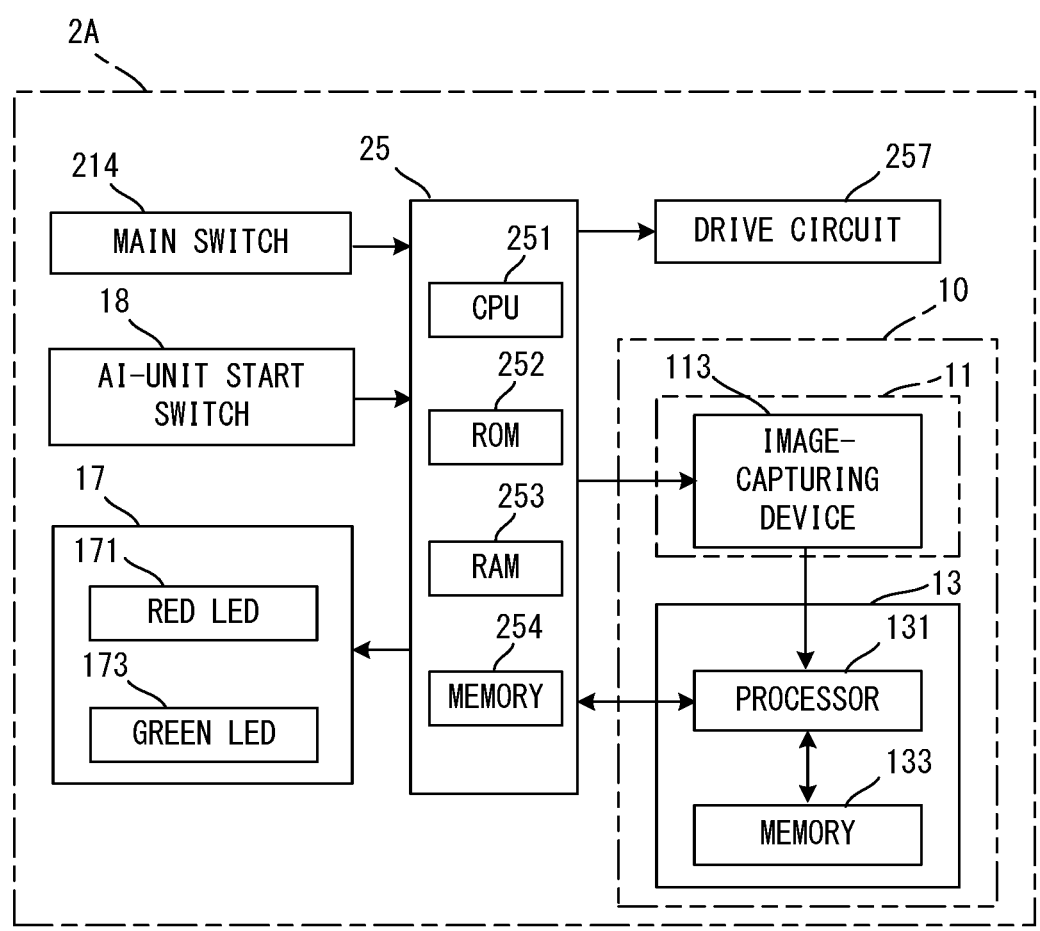
FIG. 4 is a block diagram of the grinder.

As shown in FIG. 1, in the present embodiment, the inference chip 13 is housed in the main-body case 111 of the camera main body 110 (refer to FIG. 3) and, together with the camera 11, constitutes the AI unit 10. Although the details are described below, as shown in FIG. 4, the inference chip 13 is connected to the image-capturing device 113 by one or more electrical lines and is configured to process image data output from the image-capturing device 113 and infer (determine) the state of the side handle 71A and the state of the wheel cover 81. It is noted that, in the present embodiment, a large volume of image data is output from the image-capturing device 113 to the inference chip 13. Consequently, by connecting the image-capturing device 113 and the inference chip 13 to each other by wire(s), not by a wireless connection, higher processing speed and accuracy can be ensured. In addition, the inference chip 13 is connected to the controller 25 and outputs the inference results to the controller 25.

The inference chip 13 according to the present embodiment is one type of chip or integrated circuit (a so-called AI chip) on which an AI application is installed and performs an inference process using a trained model. The inference chip 13 according to the present embodiment comprises a processor 131 and memory 133, in which are stored the trained model and instructions (applications and programs) read and executed by the processor 131. For example, a GPU (graphics-processing unit), an ASIC (application-specific integrated circuit), or an FPGA (field-programmable gate array) can be used as the processor 131, or some other type of processor or processing circuit (e.g., a CPU (central processing unit)) may be used. The memory 133 is nonvolatile memory.

A trained model means a model in which machine learning (AI model training) has been performed such that the model recognizes specific types of patterns. In the present embodiment, the trained model is trained to recognize: the side handle 71A mounted on the tool main body 20A and gripped by the user; and the wheel cover 81 mounted on the tool main body 20A. In the present embodiment, the machine learning is performed in advance in an information-processing unit (not shown), which is for learning, that differs from the grinder 2A. The machine learning may be performed by any well-known technique; as one non-limiting example, deep learning in which a neural network is used can be suitably used.

For example, a trained model can be generated by providing the model with a large volume of image data (supervised data) indicating the normal mounted/gripped state of the side handle 71A and the normal mounted state of the wheel cover 81, and then causing the model to perform deep learning. When the image data is input, the trained model outputs the certainty (probability) that the side handle 71A is in the normal mounted/gripped state and the wheel cover 81 is in the normal mounted state. The inference process, in which the trained model is used by the inference chip 13, is described in greater detail below.

It is noted that, in the explanation below, for the sake of convenience, the satisfaction of the condition that the side handle 71A is in the normal mounted/gripped state and the wheel cover 81 is in the normal mounted state is referred to simply as "the side handle 71A and the wheel cover 81 are in the normal state." On the other hand, not satisfying this condition is referred to as "the side handle 71A and the wheel cover 81 are in an abnormal state." Here, "abnormal state" encompasses, e.g., the side handle 71A and/or the wheel cover 81 is/are not mounted at all as well as the side handle 71A and/or the wheel cover 81 is/are attached to the power tool, but not in a proper (safe) manner. In addition, "abnormal state" may also encompass situations in which the user is not properly (safely) holding (gripping) the power tool.

In the present embodiment, the AI unit 10 is configured to start in response to manual manipulation of an AI-unit start switch 18. As shown in FIG. 1, the AI-unit start switch 18 is provided at an upper portion of the front-end part 201 (forward of the grip part 203) of the tool main body 20A. The AI-unit start switch 18 is a switch for starting the AI unit 10 (the camera 11 and the inference chip 13) described above. The AI-unit start switch 18 according to the present embodiment is a pushbutton switch and is configured to turn ON and OFF in response to being pressed by the user. It is noted that the AI-unit start switch 18 may be some other type of mechanical switch, such as (without limitation) a dial or toggle switch. The AI-unit start switch 18 is connected to the controller 25.

Furthermore, a reporting unit 17, which is configured to report the results of inferring the state of the side handle 71A and the state of the wheel cover 81 by the AI unit 10, is provided on the grinder 2A. The reporting unit 17 according to the present embodiment is configured to report information via light. Specifically, the reporting unit 17 comprises a red LED 171 and a green LED 173 (refer to FIG. 4). The reporting unit 17 is provided at (on) an upper portion of the rear-end part 202 of the tool main body 20A, which is easily visible to the user. The reporting unit 17 is connected to the controller 25.

The hardware configuration of the grinder 2A will be explained below.

As shown in FIG. 4, the grinder 2A comprises the controller 25, which controls the operation of the grinder 2A. A microcomputer, which comprises a CPU 251, ROM 252, RAM 253, nonvolatile memory 254, etc., is used in the controller 25 according to the present embodiment. However, other types of processors or processing circuits (e.g., a GPU, an ASIC (application-specific integrated circuit), or an FPGA (field-programmable gate array)) may be used as the controller 25.

In addition, a drive circuit 257, the main switch 214, the AI-unit start switch 18, the AI unit 10, and the reporting unit 17 are connected to the controller 25.

The drive circuit 257 is a circuit for driving the motor 21. While turned ON in response to the pressing of the trigger 213, the main switch 214 outputs a specific signal to the controller 25. In response to being turned ON/OFF, the AI-unit start switch 18 outputs the specific signal to the controller 25. In response to a signal from the AI-unit start switch 18, the controller 25 controls the supply of electric power to the AI unit 10 (in greater detail, the image-capturing device 113 of the camera 11 and the inference chip 13).

The processor 131 of the inference chip 13 outputs to the controller 25 a signal that indicates the inference results. Based on a signal from the main switch 214 and the signal from the inference chip 13, the controller 25 controls the drive of the motor 21 via the drive circuit 257. In addition, based on the signal from the inference chip 13, the controller 25 causes the red LED 171 and the green LED 173 of the reporting unit 17 to turn ON, flash, or turn OFF. It is noted that, in the present embodiment, the red LED 171 turns ON or flashes when the side handle 71A and the wheel cover 81 are in an abnormal state. The green LED 173 turns ON when the side handle 71A and the wheel cover 81 are in the normal state.

An operation controlling process of the grinder 2A, which is performed by the controller 25 (in greater detail, the CPU 251), will be explained below. The process explained below starts when the supply of electric power to the grinder 2A is started (i.e., when the battery 95 is mounted on the battery-mounting part 207) and ends when the supply of electric power to the grinder 2A is stopped (i.e., when the battery 95 is removed from the battery-mounting part 207). This process is implemented by the CPU 251 reading and executing a program stored in the ROM 252 or the memory 254. It is noted that, in the explanation and drawings below, each "step" in the process is abbreviated and denoted as "S."

Figure 5:
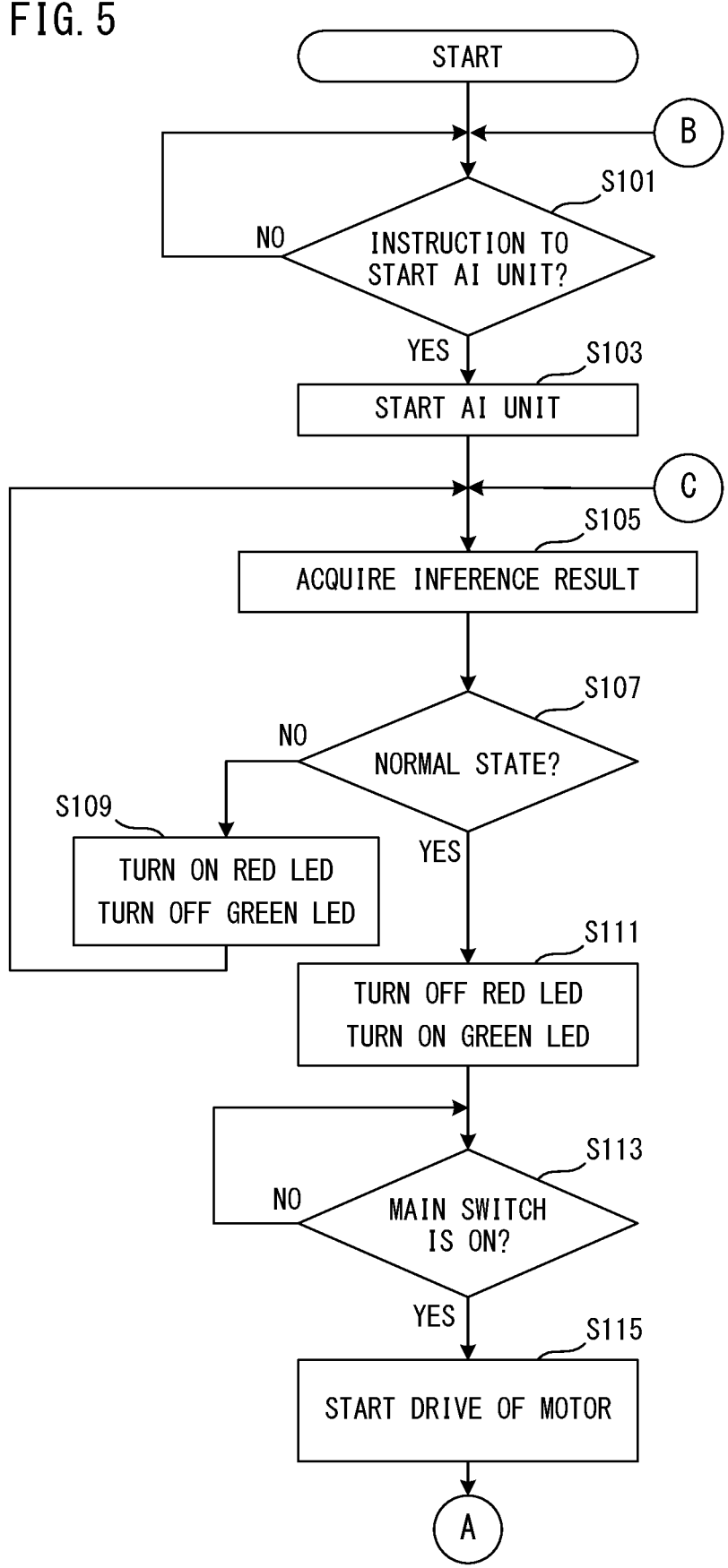
FIG. 5 is a flow chart of an operation-control process that is performed by a controller of the grinder.

As shown in FIG. 5, when the process is started, the CPU 251 stands by until acquiring an instruction to start the AI unit 10 (S101: NO, S101). In greater detail, in accordance with whether a signal has been acquired indicating that the AI-unit start switch 18 is ON, the CPU 251 determines whether an instruction to start the AI unit 10 has been acquired. It is noted that, at the start of the process, both the red LED 171 and the green LED 173 of the reporting unit 17 are in the initial state, in which both are turned OFF. By both the red LED 171 and the green LED 173 being in the turned-OFF state, the user can easily recognize that the AI-unit start switch 18 is OFF.

When it is determined that the AI-unit start switch 18 is ON and the CPU 251 has acquired an instruction to start the AI unit 10 (S101: YES), the CPU 251 supplies electric power to the AI unit 10 (the image-capturing device 113 and the inference chip 13) to start the AI unit 10 (S103). After starting, the camera 11 periodically captures an image, and image data is output from the image-capturing device 113 to the processor 131 of the inference chip 13.

Figure 7:
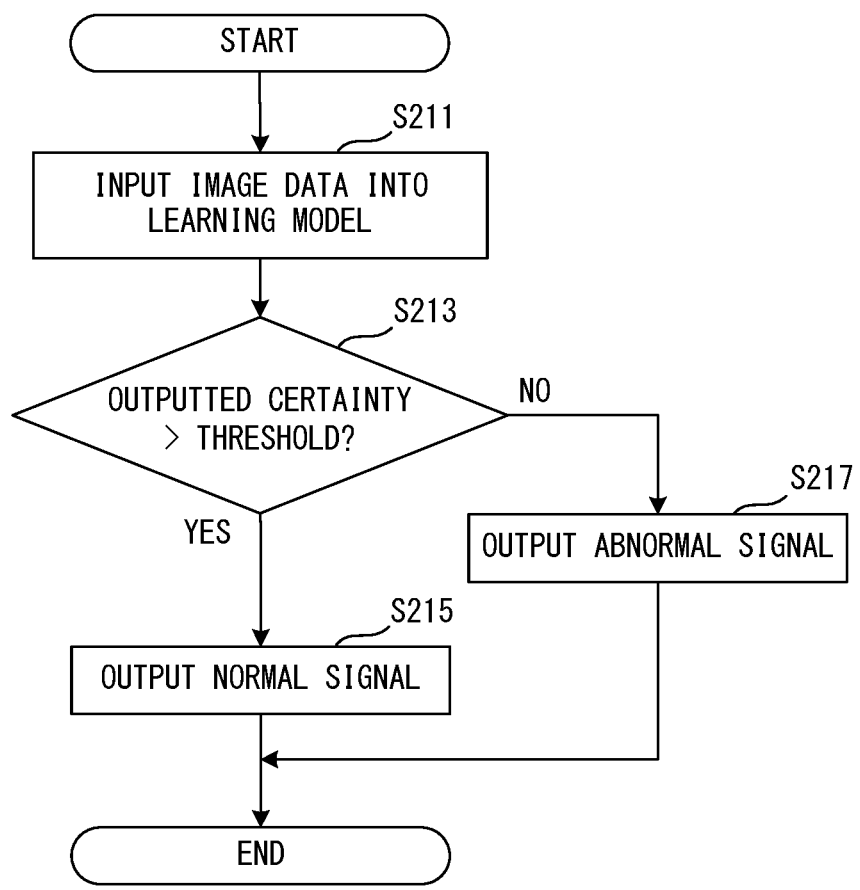
FIG. 7 is a flow chart of an inference process that is performed by an inference chip.

Every time the processor 131 of the inference chip 13 receives image data from the image-capturing device 113, the processor 131 performs (executes) the inference process, which is shown in FIG. 7, in accordance with instructions (program) stored in the memory 133. With regard to this inference process, the processor 131 first inputs to the learning model the image data that was input from the image-capturing device 113 (S211). The processor 131 determines whether the certainty (probability) output from the learning model exceeds a threshold, which is stipulated in advance (S213). In the situation in which the processor 131 has determined that the certainty exceeds the threshold (S213: YES), the processor 131 outputs, as the inference results to the controller 25, a signal (hereinbelow, called a normal signal) indicating that the side handle 71A and the wheel cover 81 are in the normal state (S215) and then ends the process. On the other hand, in the situation in which the processor 131 has determined that the certainty is the threshold value or less (S213: NO), the processor 131 outputs, as the inference results to the controller 25, a signal (hereinbelow, called an abnormal signal) indicating that the side handle 71A and the wheel cover 81 are in an abnormal state (S217), and then ends the process.

As shown in FIG. 5, the CPU 251 of the controller 25 acquires the inference results (normal signal or abnormal signal) output from the inference chip 13 (S105). The CPU 251 determines whether the normal signal has been acquired, that is, whether the side handle 71A and the wheel cover 81 are in the normal state (S107). If the acquired signal is an abnormal signal (S107: NO), the CPU 251 maintains the green LED 173 of the reporting unit 17 in the turned-OFF state and turns ON the red LED 171 (S109).

The CPU 251 repetitively performs the process of S105, S107, and S109 while an abnormal signal is continuing to be acquired, i.e., while in the abnormal state in which the user has not mounted the side handle 71A and the wheel cover 81 on the grinder 2A or the user is not gripping the side handle 71A. By turning ON the red LED 171, the user can easily recognize that the side handle 71A and the wheel cover 81 are in an abnormal state. Thereby, the user can take corrective measures to place the side handle 71A and the wheel cover 81 in the normal state (e.g., mounting the side handle 71A and the wheel cover 81 on the grinder 2A and gripping the side handle 71A).

In the situation in which a normal signal has been acquired (S107: YES), the CPU 251 turns OFF the red LED 171 or leaves it in the OFF state, and turns ON the green LED 173 (S111). By turning ON the green LED 173, the user can easily recognize that the side handle 71A and the wheel cover 81 are in the normal state.

The CPU 251 stands by until the user presses the trigger 213 and the main switch 214 is turned ON (S113: NO, S113). By starting the supply of electrical current to the motor 21 in response to the main switch 214 being turned ON, the CPU 251 starts the drive of the motor 21 (S113: YES, S115). Thus, the CPU 251 starts the drive of the motor 21 only when the side handle 71A and the wheel cover 81 are in the normal state. Thereby, the possibility that the motor 21 will be driven is reduced in the state in which the user has not mounted the side handle 71A and the wheel cover 81 on the grinder 2A and in the state in which the user is not gripping the side handle 71A.

Figure 6:
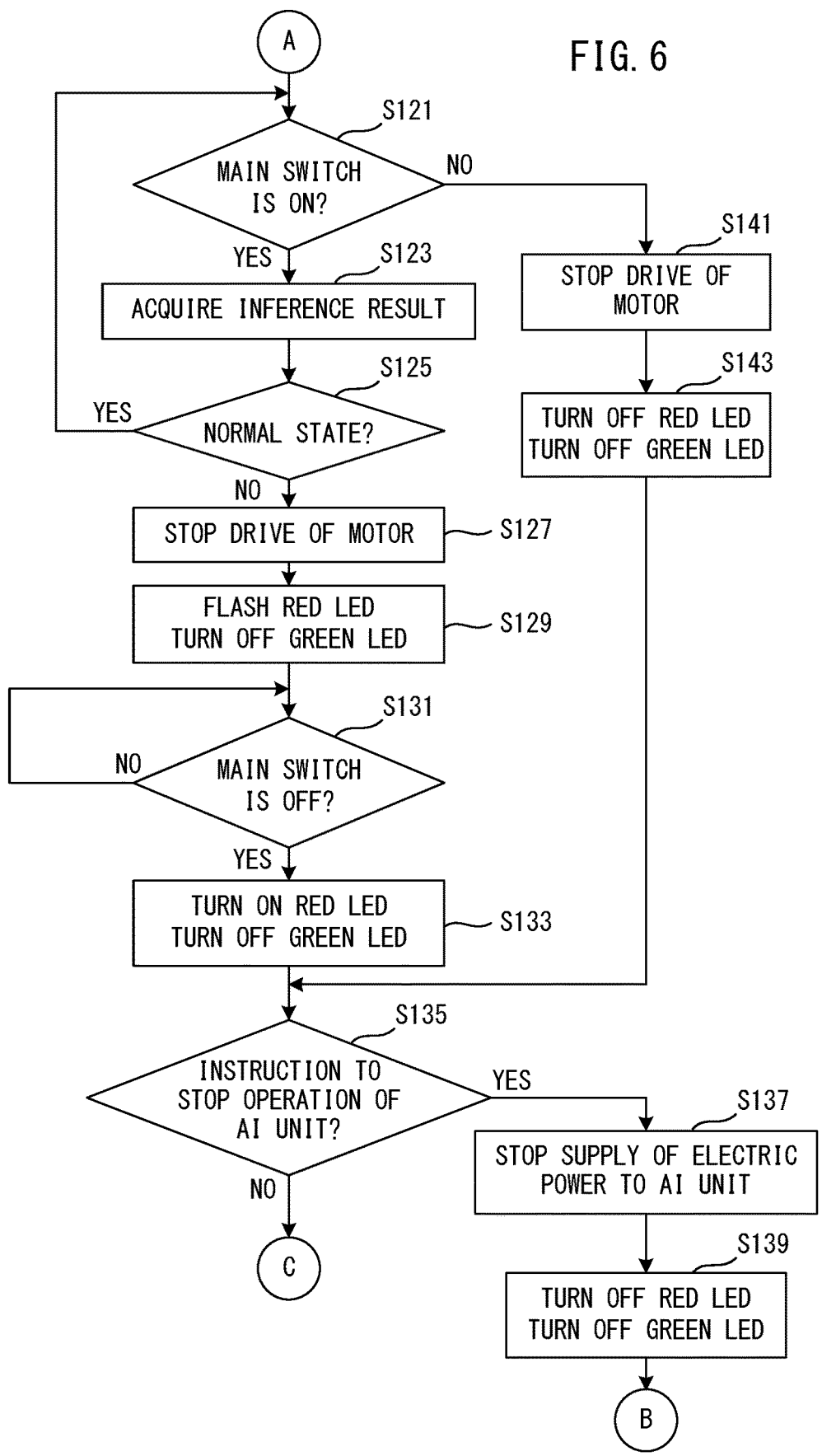
FIG. 6 is a continuation of the flow chart of the operation-control process shown in FIG. 5.

As shown in FIG. 6, when the user releases the pressing of the trigger 213 while the side handle 71A and the wheel cover 81 are in the normal state and the motor 21 is being driven, the CPU 251 determines that the main switch 214 is not ON (S121: NO). In this situation, the CPU 251 stops the drive of the motor 21 (S141), maintains the red LED 171 in the turned-OFF state, turns OFF the green LED 173 (S143), and advances to the process in S135, which is described below.

If the main switch 214 is ON after starting the drive of the motor 21 (S121: YES), then the CPU 251 acquires the inference results from the inference chip 13 (S123) and determines whether a normal signal has been acquired (S125). If a normal signal has been acquired (S125: YES), then it returns to the process in S121. Thereby, while the main switch 214 is ON and the side handle 71A and the wheel cover 81 are in the normal state, the drive state of the motor 21 is maintained.

On the other hand, if the user removes their hand from the side handle 71A while the motor 21 is being driven, the processor 131 of the inference chip 13 outputs an abnormal signal, as the inference result, based on the image data of the image of the state in which the side handle 71A is not being gripped. Thereby, the CPU 251 determines that an abnormal signal has been acquired (S125: NO) and stops the drive of the motor 21 by stopping the supply of electrical current to the motor 21 (S127). Thus, in the present embodiment, in response to the side handle 71A entering an abnormal state, the drive of the motor 21 stops promptly. Furthermore, the CPU 251 causes the red LED 171 of the reporting unit 17 to flash and turns OFF the green LED 173 (S129). Thereby, the user can easily recognize that the drive of the motor 21 has been stopped because their hand was removed from (is no longer gripping/holding) the side handle 71A. It is noted that, in S127, the CPU 251 may instead simply reduce the rotational speed of the motor 21 without stopping the drive of the motor 21.)

The CPU 251 determines whether the main switch 214 is OFF (S131). If the user continues to press the trigger 213 while their hand remains removed from the side handle 71A, because the main switch 214 is still ON, the CPU 251 monitors the main switch 214 until the main switch 214 is turned OFF (S131: NO, S131). That is, in the present embodiment, once the side handle 71A and the wheel cover 81 enter an abnormal state, the CPU 251 does not advance the process unless a reset operation is performed, in which the user releases the pressing of the trigger 213. Thereby, an unintentional resumption of the drive of the motor 21 is avoided. When the pressing of the trigger 213 by the user is released and the main switch 214 is turned OFF (S131: YES), the CPU 251 maintains the green LED 173 in the turned-OFF state and changes the red LED 171 from the flashing state to the turned-ON state (S133).

The CPU 251 determines whether an instruction to stop the operation of the AI unit 10 has been acquired based on whether the AI-unit start switch 18 is turned OFF (S135). When the AI-unit start switch 18 is turned OFF (S135: YES), the CPU 251 stops the supply of electric power to the AI unit 10 (S137), maintains the green LED 173 in the turned-OFF state, and also turns OFF the red LED 171 (S139). The CPU 251 returns to S101 in FIG. 5 and stands by until the AI-unit start switch 18 turns ON once again. Thus, in the present embodiment, by supplying electric power to the AI unit 10 only while the AI-unit start switch 18 is ON, wasteful electric power consumption can be avoided.

If the AI-unit start switch 18 remains ON (S135: NO), the CPU 251 returns to S105 in FIG. 5 and acquires a new inference result. When the user has properly gripped the side handle 71A again, the CPU 251 then acquires a normal signal, controls the reporting unit 17 as described above, and starts the drive of the motor 21 in accordance with the pressing (operation) of the main switch 214 (S107: YES, S111, S113: YES, S115).

As explained above, the grinder 2A according to the present embodiment uses image data of an image captured by the camera 11 to determine whether the state of the side handle 71A and the state of the wheel cover 81 are normal and usefully uses the determination results in a subsequent appropriate process (for controlling the drive of the motor 21 and reporting of information by the reporting unit 17).

In addition, in the present embodiment, the CPU 251 of the controller 25 controls the operation of the grinder 2A, including the control of the drive of the motor 21. In addition, the processor 131 of the inference chip 13, which is separate from the controller 25, performs an inference (determination) process based on image data from the camera 11. Thereby, the processing load on the controller 25 can be lightened, and a decrease in processing speed can be curtailed. In addition, by also installing the inference chip 13 on the grinder 2A while using the usual controller 25 for controlling the operation of the grinder 2A, the inference function using the trained model can be easily added to the grinder 2A. In addition, because the inference chip 13 is configured as the AI unit 10 integrally with the camera 11, adding it to the grinder 2A is also easy.

Second Embodiment

Figure 8:
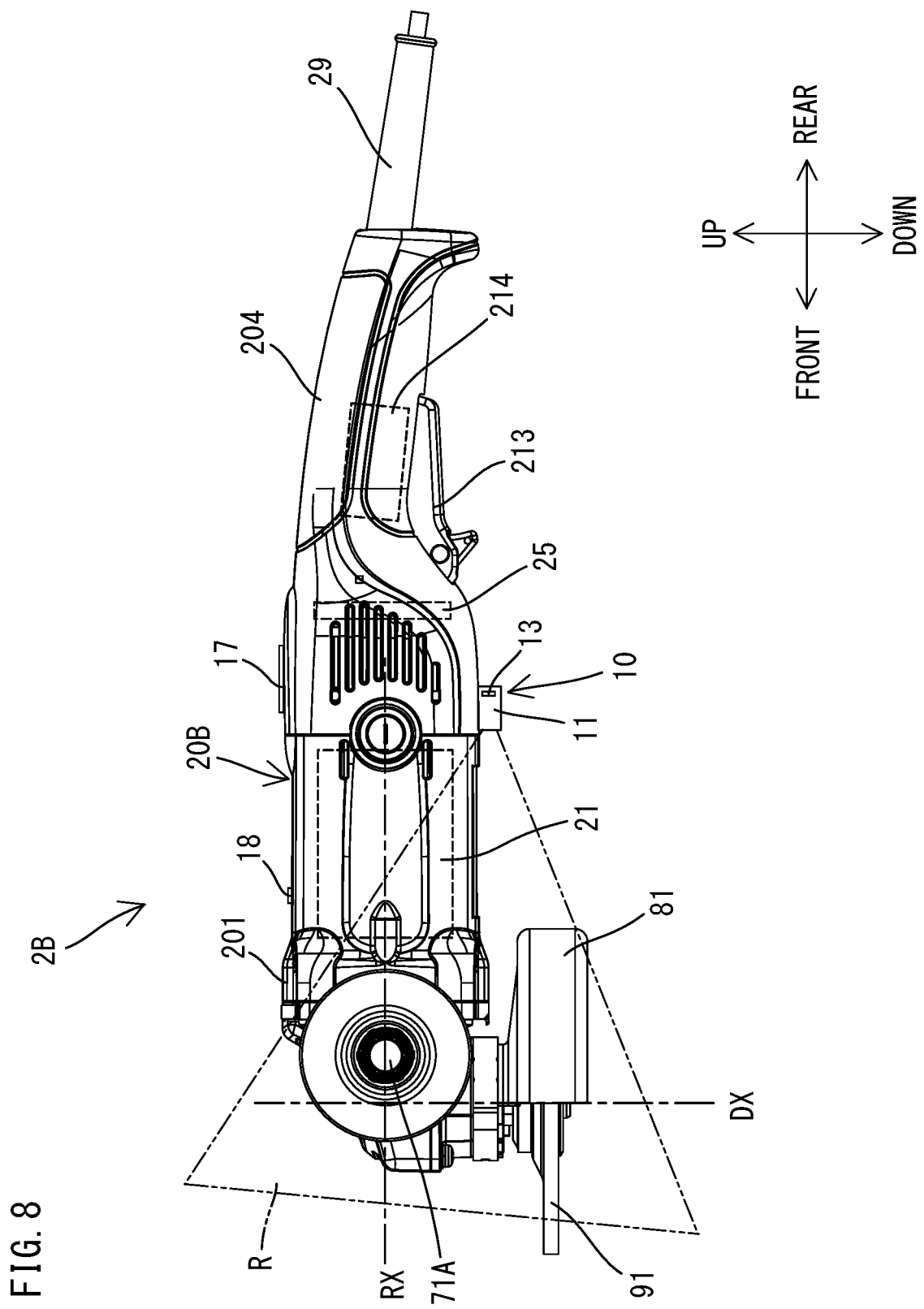
FIG. 8 is a left view of a grinder according to a second embodiment of the present disclosure.

A grinder 2B according to a second embodiment will be explained below, with reference to FIG. 8. It is noted that structural elements that are substantially identical (including situations in which the shape differs slightly) to those in the first embodiment are assigned the same symbols, and explanations thereof are abbreviated or omitted. This point applies likewise to later embodiments.

The grinder 2B of the second embodiment differs from the grinder 2A of the first embodiment (refer to FIG. 1) in that it is configured to operate by electric power supplied from an external AC-power supply and not by the battery 95. Consequently, the grinder 2B comprises a power supply cord 29, which is connectable to the external AC-power supply. The power supply cord 29 extends from the rear end of a tool main body 20B, which has an elongate shape.

A rear-end portion of the tool main body 20B of the grinder 2B is formed such that its diameter is smaller than other portions. In the present embodiment, the rear-end portion of the tool main body 20B constitutes a grip part 204 (main grip), which is gripped by the user. The trigger (switch lever) 213, which is pressable by the user, is mounted at (on) a lower portion of the grip part 204. The main switch 214 is housed inside the grip part 204. The motor 21 is disposed inside a front-half portion of the tool main body 20B such that rotational axis RX extends along the longitudinal axis of the tool main body 20B. The controller 25 is disposed between the motor 21 and the main switch 214. In addition, the AI-unit start switch 18 and the reporting unit 17 are disposed on an upper surface of a portion of the tool main body 20B that is more forward than the grip part 204.

In the present embodiment, the AI unit 10 is mounted on a lower surface of a portion of the tool main body 20B that is forward of the grip part 204 (the portion with a diameter larger than that of the grip part 204). In greater detail, the AI unit 10 is disposed more rearward than the motor 21 and is at a location that is relatively spaced apart from the side handle 71A and the wheel cover 81 in the front-rear direction. Thereby, an object can fit in image-capturing range R of the camera 11 relatively easily. In addition, even when the user is gripping the grip part 204, the user's hand does not interfere with capturing an image of the object.

The processes performed by the controller 25 of the grinder 2B and the inference chip 13 of the AI unit 10 are substantially the same as those in the first embodiment.

Third Embodiment

A hammer drill 3C according to a third embodiment will be explained below, with reference to FIG. 9 to FIG. 11. The hammer drill 3C is another representative example of a power tool according to the present disclosure and can perform a hammer operation, which linearly drives an elongate-shaped tool accessory 92 (e.g., a hammer bit or a drill bit) along drive axis DX, as well as a drill operation, which rotates the tool accessory 92 around drive axis DX. The hammer drill 3C is one example of an impact tool and also is one example of a drill tool.

First, the physical configuration of the hammer drill 3C will be explained.

Figure 9:
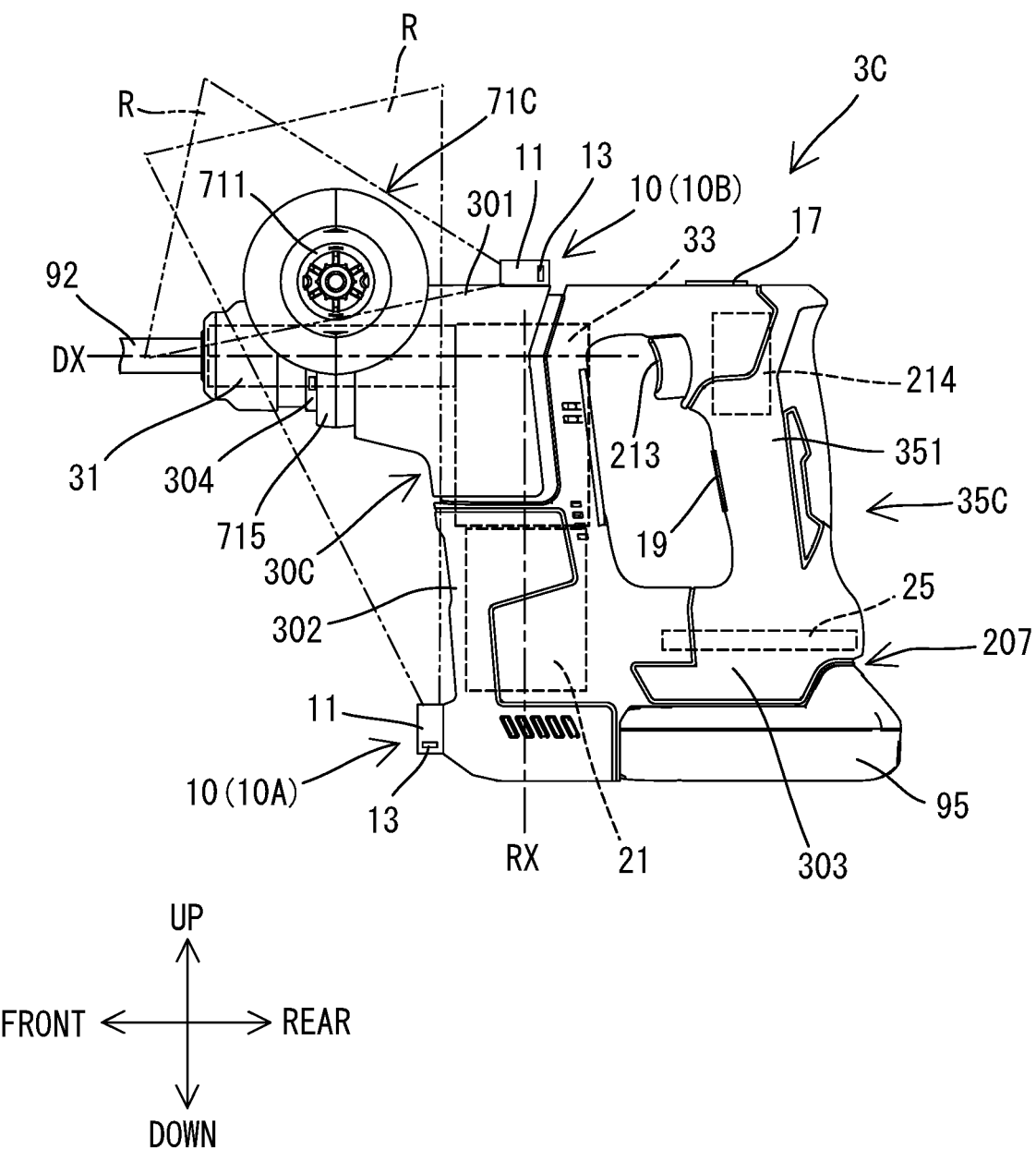
FIG. 9 is a left view of a hammer drill according to a third embodiment of the present disclosure.

As shown in FIG. 9, a tool main body 30C of the hammer drill 3C comprises a first portion 301, a second portion 302, and a third portion 303. The first portion 301 extends along drive axis DX. A tool holder 31, which holds a tool accessory in a detachable manner, is housed in one-end portion of the first portion 301 in the extension direction of drive axis DX. The portion in which the tool holder 31 is housed has a circular-tube shape and is called a barrel part 304. The second portion 302 extends in a direction that is substantially orthogonal to drive axis DX from the one-end portion of the first portion 301 on the opposite side of where the tool holder 31 is disposed. The third portion 303 extends, in a direction leading away from the tool holder 31 and substantially parallel to drive axis DX, from an end portion on the protruding side of the second portion 302.

It is noted that, in the explanation below, for the sake of convenience, the extension direction of drive axis DX is defined as the front-rear direction of the hammer drill 3C. In the front-rear direction, the side on which the tool holder 31 is disposed is defined as the front side, and the opposite side is defined as the rear side. The direction orthogonal to drive axis DX and corresponding to the extension direction of the second portion 302 is defined as the up-down direction of the hammer drill 3C. In the up-down direction, the side on which the first portion 301 is located is defined as the upper side, and the side on which the third portion 303 is located is defined as the lower side. The direction orthogonal to the front-rear direction and the up-down direction is defined as the left-right direction.

The motor 21 is housed in a lower portion of the second portion 302 of the tool main body 30C. The motor 21 is disposed such that rotational axis RX intersects drive axis DX. A drive mechanism 33, which has a well-known configuration, is disposed between the motor 21 and the tool holder 31 in the motive-power-transmission pathway. In addition, the battery-mounting part 207 is provided on the third portion 303. The controller 25 is disposed in the interior of the third portion 303.

A main handle 35C, which comprises a grip part 351 (main grip), is coupled to the tool main body 30C. The end portions of the main handle 35C are respectively coupled to the rear end of the first portion 301 and to the upper end of a rear-end portion of the third portion 303. The grip part 351 extends in the up-down direction rearward of the second portion 302. The trigger 213, which is pressable by the user's finger, is provided on the front side of an upper-end portion of the grip part 351. The main switch 214 is disposed inside the grip part 351. In addition, the reporting unit 17 is provided on an upper surface of the main handle 35C.

A side handle 71C is mountable on the hammer drill 3C. The side handle 71C enables the user to hold the hammer drill 3C with both hands, and thereby the user can increase their holding force opposing the reaction torque generated by the tool main body 30C.

Figure 10:
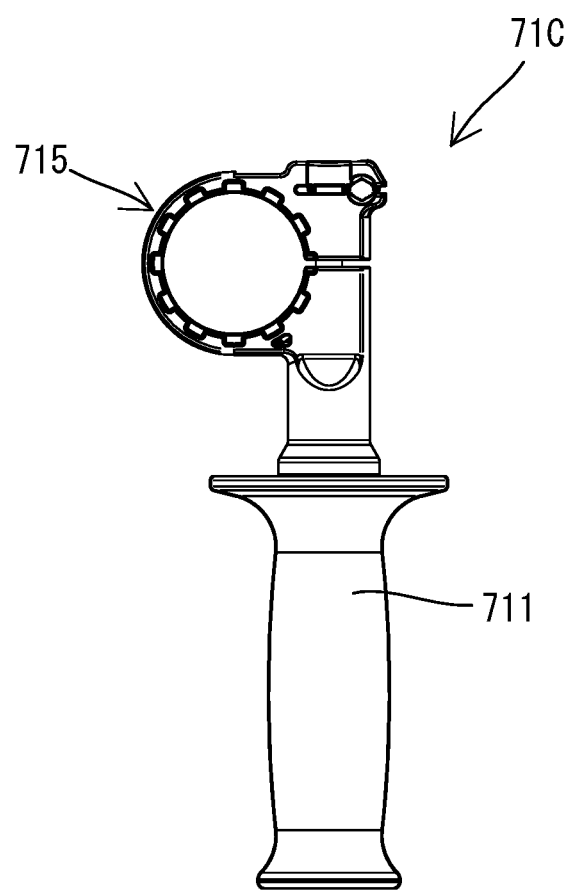
FIG. 10 is an overall view of a side handle.

As shown in FIG. 10, the side handle 71C comprises the grip part 711 and a mounting part 715. The mounting part 715 of the present embodiment is a portion that protrudes from one-end portion of the grip part 711 and is configured to be mounted on (fixed by coupling to) the barrel part 304 of the tool main body 30C. The mounting part 715 is configured to be fastenable to the outer circumference of the barrel part 304. Because the structure of the mounting part 715 of this kind is well known, detailed explanation and illustration thereof are omitted. When the side handle 71C is mounted on the tool main body 30C, the grip part 711 protrudes radially outward (in a direction orthogonal to drive axis DX) from the barrel part 304. The user can use the side handle 71C by mounting it on the tool main body 30C such that the grip part 711 faces a desired direction in accordance with the user's handedness, the work environment, and the like.

In the present embodiment, the hammer drill 3C is configured to infer the state of the side handle 71C and to control the operation of the hammer drill 3C in accordance with the inference results. Consequently, the same as in the first embodiment, the hammer drill 3C comprises the AI unit 10, which comprises the camera 11 and the inference chip 13. However, as shown in FIG. 9, to reliably capture an image of the side handle 71C, two of the AI units 10 are provided. The two AI units 10 are each connected to the controller 25.

In greater detail, one of the two AI units 10 (hereinbelow, called a first unit 10A) is mounted on a front surface of a lower-end portion of the second portion 302 of the tool main body 30C such that the lens 117 of the camera 11 faces diagonally frontward and upward. This location is substantially most spaced apart from the barrel part 304 in the up-down direction and is a location that is relatively near the barrel part 304 in the front-rear direction. Thereby, the camera 11 of the first unit 10A can fit the barrel part 304 and the regions left and right of the barrel part 304 in image-capturing range R without using a lens that is particularly wide angle.

However, the region directly above the tool main body 30C is a blind spot of the camera 11. In addition, owing to the orientation of the lens 117, the region more rearward than the barrel part 304 is not included in image-capturing range R of the camera 11. Thereby, when the grip part 711 extends upward from the barrel part 304 and the user extends their hand from the rear and grips the grip part 711 upward of the tool main body 30C, even if an image of the mounting part 715 mounted on the barrel part 304 can be captured, there is a possibility that an image of the hand that grips the grip part 711 cannot be captured reliably.

Accordingly, the other of the two AI units 10 (hereinbelow, called a second unit 10B) is disposed so as to cover the region corresponding to the blind spot of the camera 11 of the first unit 10A described above. In greater detail, the second unit 10B is mounted on an upper surface of a rear-end portion of the first portion 301 of the tool main body 30C such that the lens 117 faces forward. Thereby, even when the side handle 71C is disposed such that the grip part 711 extends upward from the barrel part 304, the camera 11 of the second unit 10B can capture an image of at least a portion of the side handle 71C mounted on the barrel part 304 and at least a portion of the hand that grips the grip part 711.

In addition, the hammer drill 3C comprises an AI-unit start sensor 19 instead of the AI-unit start switch 18 in the first embodiment (refer to FIG. 1). In greater detail, the AI-unit start sensor 19 is mounted on a front surface of the grip part 351 of the main handle 35C and can detect the gripping of the grip part 351 by the user's hand. The detection system of the AI-unit start sensor 19 is not particularly limited; for example, a capacitance-type, an infrared-type, or an ultrasonic-type sensor can be used. The AI-unit start sensor 19 is connected to the controller 25 and outputs a specific signal to the controller 25 while the AI-unit start sensor 19 is detecting that the grip part 351 is being gripped.

The hardware configuration of the hammer drill 3C will be explained below.

Figure 11:
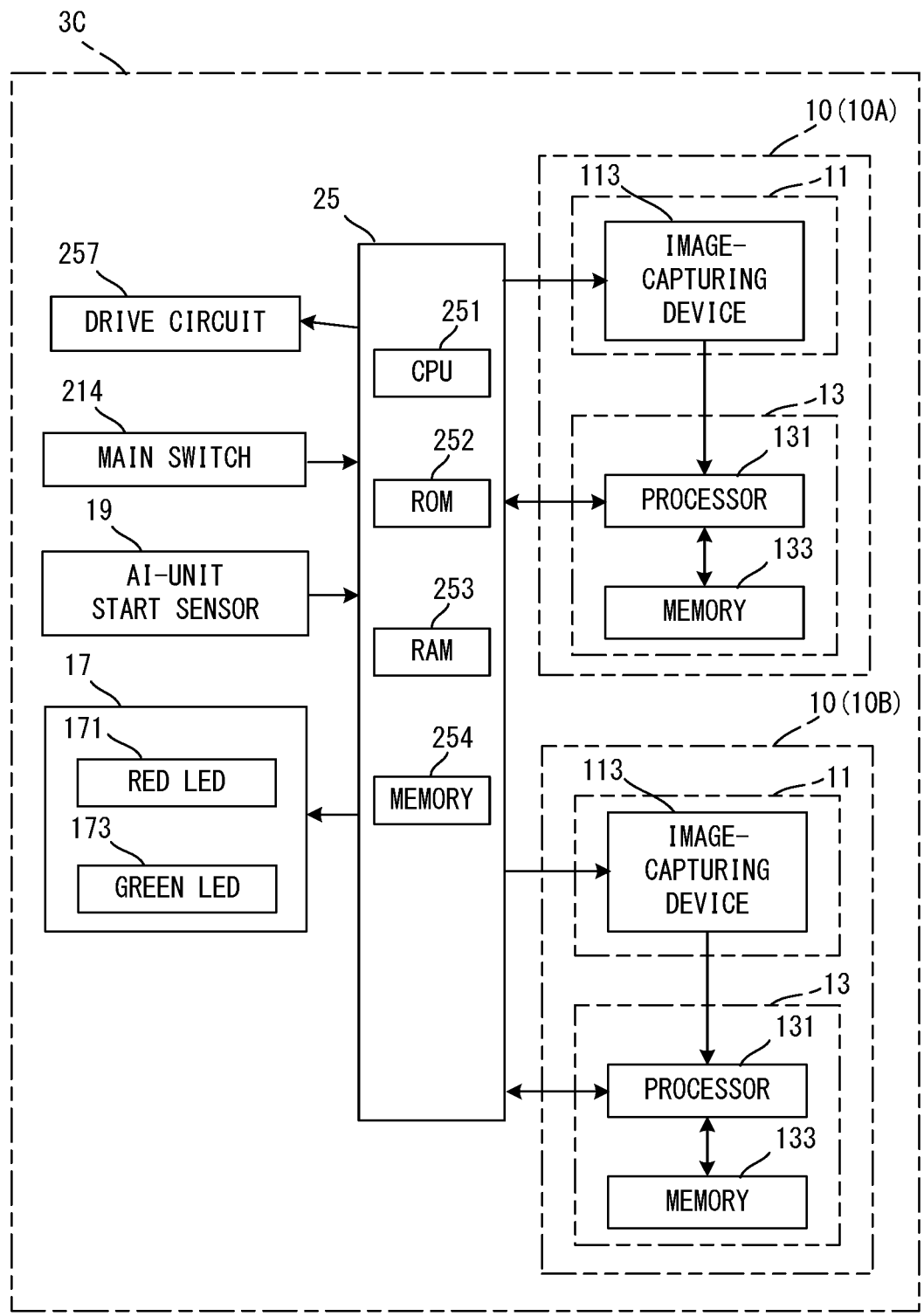
FIG. 11 is a block diagram of the hammer drill.

As shown in FIG. 11, the hammer drill 3C comprises: the controller 25; the drive circuit 257, which is connected to the controller 25; the main switch 214; the AI-unit start sensor 19; the first unit 10A; the second unit 10B; and the reporting unit 17. In the present embodiment, the controller 25 supplies electric power to the first unit 10A and the second unit 10B in response to a signal from the AI-unit start sensor 19 indicating that the grip part 351 is being gripped. The inference chip 13 of the first unit 10A and the inference chip 13 of the second unit 10B each outputs to the controller 25 a signal indicating the corresponding inference result. The controller 25 controls the drive of the motor 21 via the drive circuit 257 based on the signal from the main switch 214 and the signal from the inference chips 13 of the first unit 10A and the second unit 10B. In addition, it causes the red LED 171 and the green LED 173 of the reporting unit 17 to turn ON, flash, or turn OFF.

A process of controlling the operation of the hammer drill 3C, which is performed by the controller 25 (in greater detail, the CPU 251), will be explained below. It is noted that, because the flow of this process is substantially identical to the majority of the flow of the process performed by the grinder 2A in the first embodiment, only processes that differ from those of the first embodiment are explained simply below, with reference to FIG. 5 and FIG. 6, the same as in the first embodiment.

As shown in FIG. 5, when the process is started, the CPU 251 first determines, in response to a signal from the AI-unit start sensor 19, whether an instruction to start the AI unit 10 has been acquired (S101). When the CPU 251 determines that an instruction to start the AI unit 10 has been acquired (S101: YES), electric power is supplied to the two AI units 10 (the first unit 10A and the second unit 10B), and the two AI units 10 are started (S103). After starting, in each of the AI units 10, image data is output from the image-capturing device 113 to the processor 131 of the inference chip 13, and the inference process is performed by the processor 131 (refer to FIG. 7).

The CPU 251 of the controller 25 acquires the inference results (normal signal or abnormal signal) output from the inference chips 13 of the two AI units 10 (S105). As described above, in the present embodiment, the locations at which the grip part 711 of the side handle 71C can be disposed are all covered by the cameras 11 of the two AI units 10. Thereby, it can be said that the side handle 71C and the wheel cover 81 are in the normal state as long as a normal signal is being acquired from at least one of the two AI units 10. Accordingly, continuing in S107, the CPU 251 determines whether a normal signal has been acquired from at least one of the two AI units 10.

In the subsequent steps S123 and S125 (FIG. 6) as well, the CPU 251 likewise performs (executes) processes based on the inference results of the two AI units 10. In addition, in S135, in the situation in which a signal is not being acquired from the AI-unit start sensor 19, the CPU 251 determines that an instruction to stop operation of the AI unit 10 has been acquired (S135: YES) and therefore stops the supply of electric power to the two AI units 10 (S137).

As explained above, in the present embodiment, image data of images captured by the cameras 11 of the two AI units 10 is used to determine whether the state of the side handle 71C is normal, and the determination results can be usefully used in subsequent appropriate processes (e.g., controlling the drive of the motor 21 and reporting of information by the reporting unit 17).

In addition, in the present embodiment as well, by supplying electric power to the AI units 10 only while the AI-unit start sensor 19 is ON, wasteful electric power consumption can be avoided. Usually, the user grips the grip part 351 of the main handle 35C when they wish to start processing work. In the present embodiment, because the AI units 10 are started in response to this usual operation, the user does not need to perform a separate special operation to start the AI units 10. Thereby, it is possible to achieve an improvement in convenience and a further savings in electric power consumption.

Fourth Embodiment

A hammer drill 3D according to a fourth embodiment will be explained below, with reference to FIG. 12. It is noted that the directions of the hammer drill 3D are defined the same as the directions of the hammer drill 3C according to the third embodiment (refer to FIG. 9).

Figure 12:
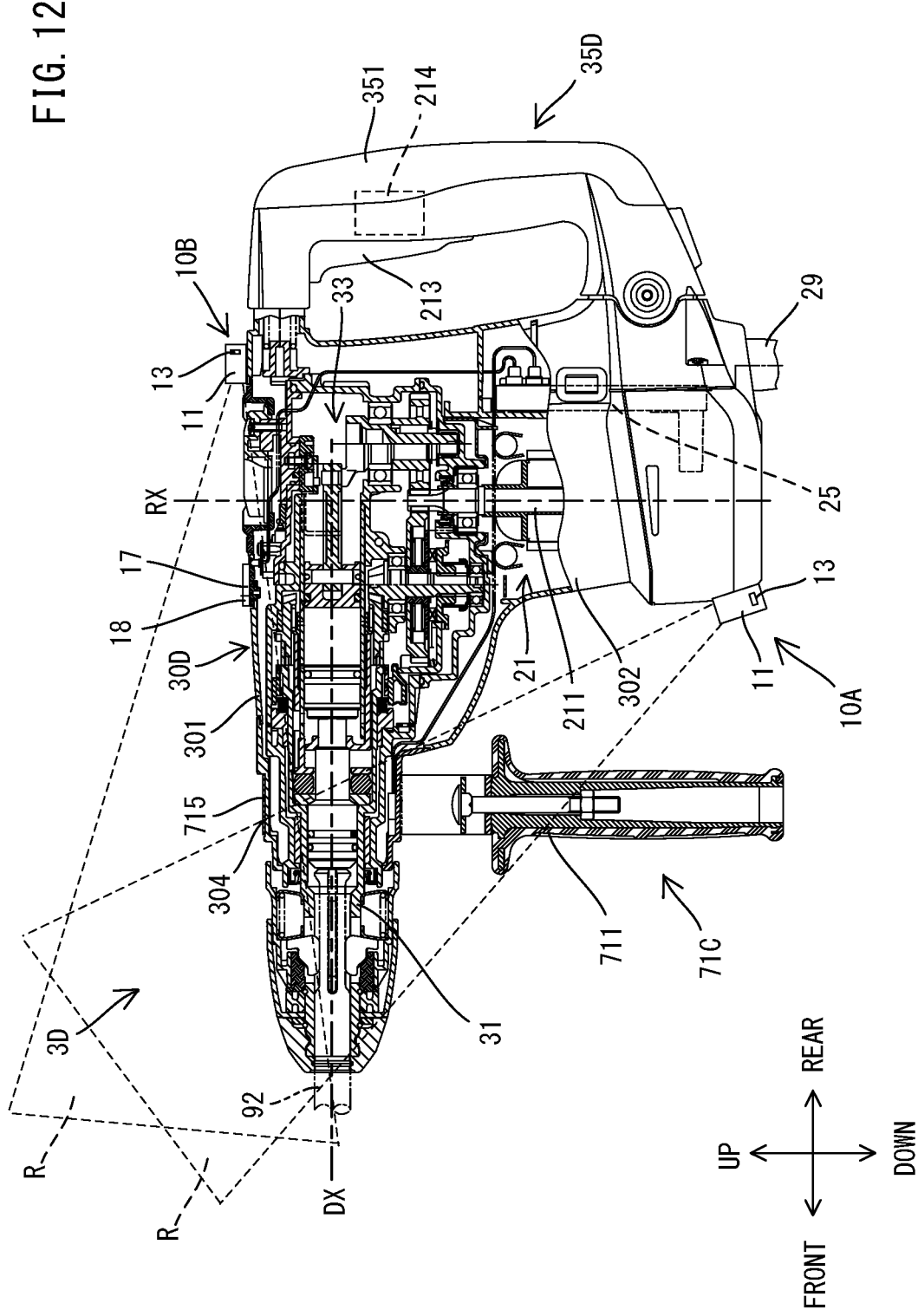
FIG. 12 is a left view of a hammer drill according to a fourth embodiment of the present disclosure.

As shown in FIG. 12, a tool main body 30D of the hammer drill 3D according to the fourth embodiment comprises a first portion 301 and a second portion 302, which are disposed in an L shape. The first portion 301 comprises a barrel part 304, which houses a tool holder 31, and extends in the front-rear direction along drive axis DX. The second portion 302 extends downward from a rear-end portion of the first portion 301. A power supply cord 29, which is connectable to the external AC-power supply, extends from the lower end of the tool main body 30D (the second portion 302). A motor 21 is disposed inside the second portion 302 such that rotational axis RX intersects drive axis DX. A controller 25 is disposed rearward of the motor 21 inside the second portion 302. A drive mechanism 33, which has a well-known configuration, is disposed between the motor 21 and the tool holder 31 in the motive-power-transmission pathway. An AI-unit start switch 18 and a reporting unit 17 are provided on an upper surface of the tool main body 30D (the first portion 301).

A main handle 35D, which comprises a grip part 351, is coupled to the tool main body 30D. The ends of the main handle 35D are respectively coupled to the rear end of the first portion 301 and to the rear end of the second portion 302. The grip part 351 of the main handle 35D extends in the up-down direction rearward of the tool main body 30D. A trigger (switch lever) 213, which is pressable by the user, is provided on the front side of an upper-end portion of the grip part 351. A main switch 214 is disposed inside the grip part 351.

The same as in the third embodiment, the side handle 71C is mountable on the barrel part 304 of the hammer drill 3D. Thereby, the hammer drill 3D comprises the two AI units 10 (the first unit 10A and the second unit 10B). The first unit 10A is mountable on a front surface of a lower-end portion of the second portion 302 such that the lens 117 of the corresponding camera 11 faces diagonally frontward and upward. The second unit 10B is mounted on an upper surface of a rear-end portion of the first portion 301 such that the corresponding lens 117 faces forward. Thereby, in the present embodiment as well, the locations at which the grip part 711 of the side handle 71C can be disposed are all covered by the cameras 11 of the two AI units 10.

The electrical configuration of the hammer drill 3D is substantially identical to that of the third embodiment, other than points of difference with the AI-unit start switch 18 and the AI-unit start sensor 19. In addition, the process of controlling the operation of the hammer drill 3D, which is performed by the controller 25 (in greater detail, the CPU 251) is also the same. Thereby, explanations of these are omitted.

Fifth Embodiment

Figure 13:
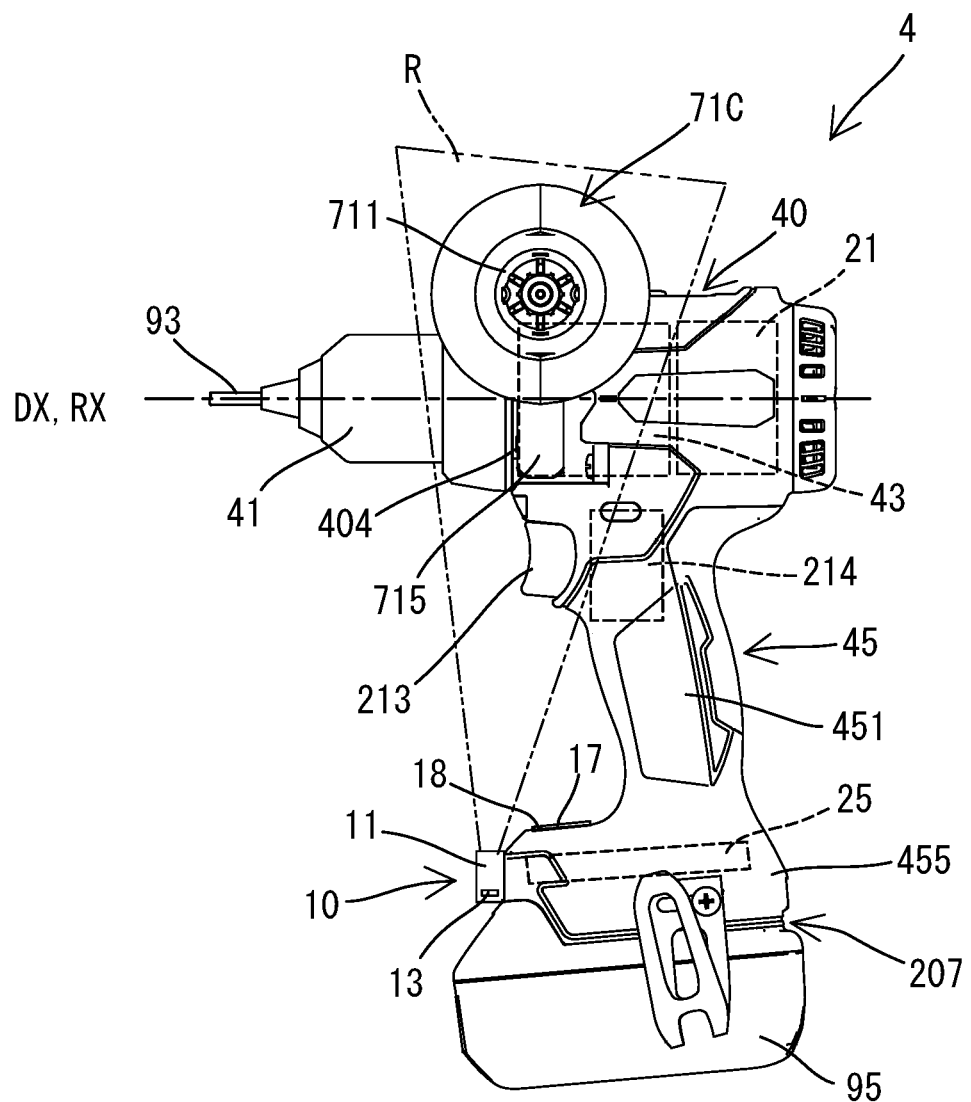
FIG. 13 is a left view of a driver-drill according to a fifth embodiment of the present disclosure.
Figure 13:
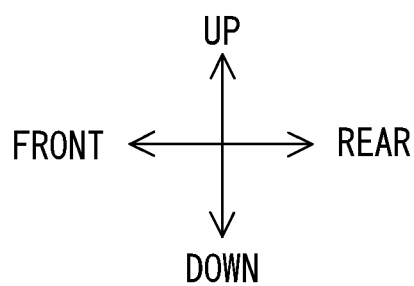

A driver-drill 4 according to a fifth embodiment will be explained below, with reference to FIG. 13. The driver-drill 4 is another representative example of a power tool according to the present disclosure and, in greater detail, is one example of a drill tool configured to perform drilling work by rotationally driving an elongate-shaped tool accessory 93 (e.g., a drill bit).

First, the physical configuration of the driver-drill 4 will be explained. As shown in FIG. 13, a tool main body 40 of the driver-drill 4 extends along drive axis DX. A chuck 41, which holds the tool accessory 93 in a detachable manner, is provided at one-end portion of the tool main body 40 in the extension direction of drive axis DX. The portion of the tool main body 40 at which the chuck 41 is coupled has a circular-tube shape and is called a barrel part 404. A side handle 71C, which has a mounting part 715 that fastens to the barrel part 404, is mountable on the barrel part 404. A main handle 45 of the driver-drill 4 protrudes in a direction substantially orthogonal to drive axis DX from substantially the center portion of the tool main body 40.

It is noted that, in the explanation below, for the sake of convenience, the extension direction of drive axis DX is defined as the front-rear direction of the elastic body 155. In the front-rear direction, the side on which the chuck 41 is disposed is defined as the front side, and the opposite side is defined as the rear side. The direction orthogonal to drive axis DX and corresponding to the extension direction of the main handle 45 is defined as the up-down direction of the driver-drill 4. In the up-down direction, the protrusion direction of the main handle 45 is defined as the downward direction, and the opposite direction is defined as the upward direction. The direction orthogonal to the front-rear direction and the up-down direction is defined as the left-right direction.

A motor 21 is housed in a rear portion of the tool main body 40. Rotational axis RX of the motor 21 is substantially coaxial with drive axis DX. A drive mechanism 43, which has a well-known configuration, is disposed between the motor 21 and the chuck 41 in the motive-power-transmission pathway.

The main handle 45 comprises a grip part 451, which is gripped by the user. A trigger 213, which is pressable by the user, is provided on the front side of an upper-end portion of the grip part 451. A main switch 214 is disposed inside the grip part 451. A lower-end part 455 of the main handle 45 is formed in a rectangular-box shape and comprises a battery-mounting part 207. In addition, a controller 25 is housed in a lower-end part 455 of the main handle 45.

The driver-drill 4 is configured to infer the state of the side handle 71C and to control the operation of the driver-drill 4 in accordance with the inference results. Consequently, the same as in the first embodiment, the driver-drill 4 comprises an AI unit 10, which comprises a camera 11 and an inference chip 13. In addition, an AI-unit start switch 18 and a reporting unit 17 are provided on an upper surface of the lower-end part 455.

In the present embodiment, the AI unit 10 is mounted on a front surface of the lower-end part 455 of the main handle 45 such that the lens 117 of the camera 11 faces upward. This location is substantially most spaced apart from the barrel part 404 in the up-down direction and is substantially the same location as the barrel part 404 in the front-rear direction. Thereby, the camera 11 can fit the barrel part 404 and the regions left and right of the barrel part 404 into image-capturing range R without using a lens having a particularly wide angle. It is noted that, the same as in the third embodiment, the region directly above of the tool main body 40 is a blind spot of the camera 11. Nevertheless, with regard to the driver-drill 4, because there is a relatively small possibility that the side handle 71C will be mounted with an orientation such that the grip part 711 extends upward from the barrel part 404, only one AI unit 10 need be provided. However, the same as in the third embodiment, another AI unit 10 may be mounted on an upper surface of a rear-end portion of the tool main body 40.

The electrical configuration of the driver-drill 4 and the process of controlling the operation of the driver-drill 4, which is performed by the controller 25 (in greater detail, the CPU 251), are substantially identical to those in the first embodiment. Therefore, explanations of these are omitted.

Sixth Embodiment

A power tool system 5F according to a sixth embodiment will be explained below, with reference to FIG. 14.

Figure 14:
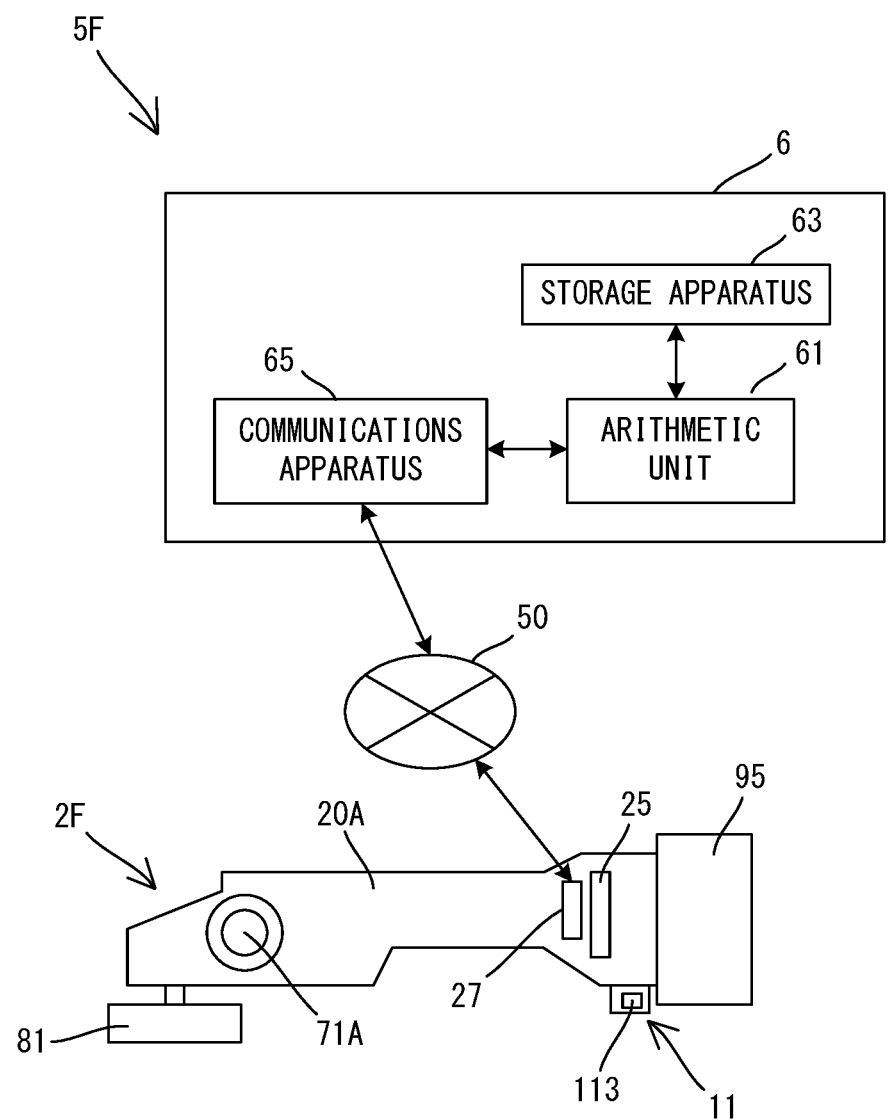
FIG. 14 is an explanatory diagram of the overall configuration of a power tool system according to a sixth embodiment of the present disclosure.

As shown in FIG. 14, the power tool system 5F according to the present embodiment comprises a grinder 2F and an information-processing unit 6, which is connected to the grinder 2F via a network 50.

The grinder 2F differs from the grinder 2A of the first embodiment (refer to FIG. 1) only in that it comprises a communications apparatus 27, which is connectable to the network 50, and does not comprise the inference chip 13. The communications apparatus 27 is connectable to the network 50 wirelessly or by wire (e.g., by a mobile-phone communications network, a wireless LAN (local-area network), or the Internet). The communications apparatus 27 may have any well-known configuration, as long as communication can be performed with an external apparatus via the network 50 in accordance with a standard that is stipulated in advance. The communications apparatus 27 is connected to a controller 25. A camera 11, instead of the AI unit 10, is mounted on the lower end of a rear-end part 202 of the grinder 2F. An image-capturing device 113 of the camera 11 is connected to the controller 25.

The information-processing unit 6 has the configuration of, for example, a well-known computer and comprises at least: an arithmetic unit 61, which performs arithmetic processing (e.g., image analysis and calculations); a storage apparatus 63, which stores information; and a communications apparatus 65, which is connectable to the network 50 wirelessly or by wire.

The arithmetic unit 61 may be any well-known apparatus capable of arithmetic processing. The arithmetic unit 61 is configured as a microcomputer comprising, for example, a CPU, ROM, and RAM. However, instead of a microcomputer, another type of processor or processing circuit (e.g., a GPU, an ASIC (application-specific integrated circuit), or an FPGA (field-programmable gate array)) may be used.

The storage apparatus 63 may be any well-known storage apparatus including, for example, a storage medium such as a semiconductor memory device, a magnetic-disk apparatus, and the like. In the present embodiment, the machine learning explained in the first embodiment is performed by the information-processing unit 6. At least the most recent trained model obtained by machine learning is stored in the storage apparatus 63. A program performed by the CPU of the arithmetic unit 61 may be stored in ROM or may be stored in the storage apparatus 63.

The communications apparatus 65 may be any well-known configuration, as long as it can perform communication with an external apparatus via the network 50 in accordance with a standard that is stipulated in advance, the same as in the communications apparatus 27 of the grinder 2F.

A process of the power tool system 5F according to the present embodiment will be explained simply below.

For example, when started by the controller 25, the camera 11 of the grinder 2F captures an image periodically. The image-capturing device 113 outputs image data to the controller 25. When the controller 25 (the CPU 251) of the grinder 2F acquires image data from the image-capturing device 113, the controller 25 transmits the image data to the information-processing unit 6 via the communications apparatus 27 and the network 50.

The CPU of the arithmetic unit 61 of the information-processing unit 6 uses the trained model stored in the storage apparatus 63 to perform a process of inferring the state of the side handle 71A and the state of the wheel cover 81 based on the image data transmitted from the grinder 2F. This inference process (refer to FIG. 7) should be substantially the same as the inference process performed by the processor 131 of the inference chip 13 according to the first embodiment. The arithmetic unit 61 further transmits data indicating the inference results to the grinder 2F via the communications apparatus 65 and the network 50.

The same as was explained in the first embodiment, the CPU 251 of the grinder 2F controls the operation of the grinder 2F. Specifically, in S105 in FIG. 5, the CPU 251 acquires inference results transmitted from the information-processing unit 6. Subsequent processes are as they were explained in the first embodiment.

As was explained above, the power tool system 5F according to the present embodiment comprises: the grinder 2F, which comprises the camera 11; and the information-processing unit 6, which is connected to the grinder 2F via the network 50. The grinder 2F transmits to the information-processing unit 6 the image data output from the camera 11, and receives the results, produced by the arithmetic unit 61 of the information-processing unit 6, of inferring the state of the side handle 71A and the state of the wheel cover 81; those inference results can be usefully used in subsequent appropriate processes (controlling the driver of the motor 21 and reporting of information by the reporting unit 17).

Seventh Embodiment

Figure 15:
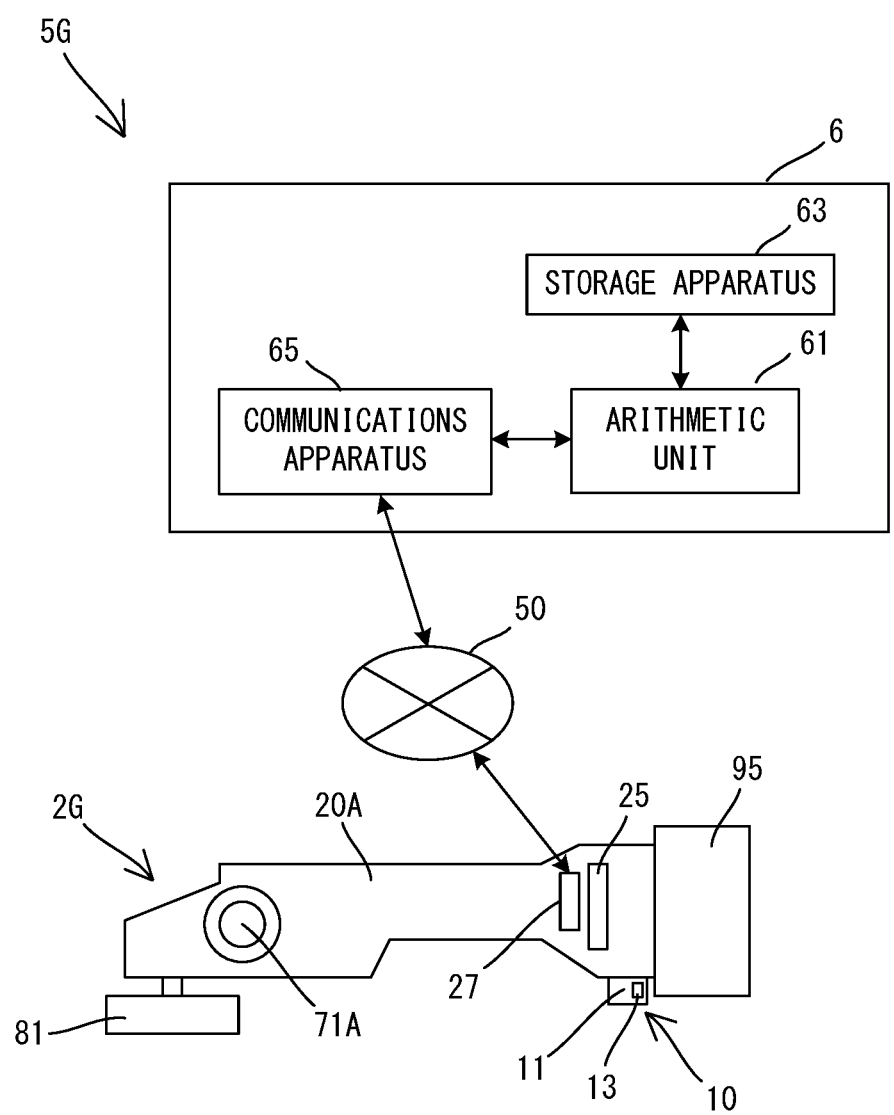
FIG. 15 is an explanatory diagram of the overall configuration of a power tool system according to a seventh embodiment of the present disclosure.

A power tool system 5G according to a seventh embodiment will be explained below. As shown in FIG. 15, the power tool system 5G is a modified example of the power tool system 5F according to the sixth embodiment (refer to FIG. 14) and comprises a grinder 2G and the information-processing unit 6, which is connected to the grinder 2G via the network 50.

In the present embodiment as well, the same as in the sixth embodiment, machine learning is performed by the information-processing unit 6, and at least the trained model obtained by machine learning is stored in the storage apparatus 63. On the other hand, in contrast to the inference process being performed by the information-processing unit 6 in the sixth embodiment, the inference process in the present embodiment is performed by the grinder 2G. Thereby, the same as in the first embodiment, the grinder 2G according to the present embodiment comprises the inference chip 13, which, together with the camera 11, constitutes the AI unit 10.

A process of the power tool system 5G according to the present embodiment will be explained simply below.

In the present embodiment, the most recent trained model stored in the information-processing unit 6 is transmitted to the grinder 2G, and the inference chip 13 of the grinder 2G performs the inference process using the most recent trained model. Consequently, for example, when the process in FIG. 5 is started, the controller 25 (the CPU 251) of the grinder 2G first issues a request to the information-processing unit 6 for the most recent learning model, and the arithmetic unit 61 of the information-processing unit 6, in response to this request, should transmit the most recent trained model to the grinder 2G. The controller 25 (the CPU 251) of the grinder 2G stores the received trained model in the nonvolatile memory 254 or in the memory 133 of the inference chip 13 (refer to FIG. 4). Subsequent processes are as they were explained in the first embodiment.

In addition, the CPU 251 may associate the image data that was the object of the inference and the inference result and transmit such to the information-processing unit 6 via the communications apparatus 27 and the network 50. The inference result and the image data should be transmitted every time an inference result is acquired or in accordance with a prescribed condition (e.g., only the inference result and image data immediately before the start of the drive of the motor 21). In the information-processing unit 6, machine learning is performed using the image data and the inference result transmitted from the grinder 2G, and thereby the trained model is updated.

As was explained above, in the power tool system 5G according to the present embodiment, the inference chip 13 is configured to function as so-called edge AI (edge computing). Because machine learning, whose processing load is heavy, is performed by the information-processing unit 6 while the inference process, in which the most recent trained model is used, is performed by the grinder 2G, a system that excels in processing efficiency and inference accuracy can be achieved.

The correspondence relationships among the structural elements (features) of the above-mentioned embodiments and the structural elements (features) of the present disclosure and the invention are indicated below. However, the structural elements according to the embodiments are merely examples and do not limit the structural elements of the present disclosure or the present invention.

The grinders 2A, 2B, 2F, 2G, the hammer drills 3C, 3D, and the driver-drill 4 each is one example of a "power tool." Each of the side handles 71A, 71C is one example of an "accessory" and an "auxiliary handle." The wheel cover 81 is one example of an "accessory" and a "cover." The camera 11 is one example of a "camera." The processor 131 of the inference chip 13 is one example of a "determining part" and a "processor." The memory 133 is one example of a "memory." The inference chip 13 is one example of a "chip." Each of the tool main bodies 20A, 20B, 30C, 30D, 40 is one example of a "tool main body." The motor 21 is one example of a "motor." The trigger (switch lever) 213 is one example of a "manipulatable member." The main switch 214 is one example of a "main switch." The CPU 251 of the controller 25 is one example of a "control part." The reporting unit 17 is one example of a "reporting unit." The AI-unit start switch 18 and the AI-unit start sensor 19 each is one example of a "detection part." The camera guard 15 is one example of a "camera guard." The lens hood 118 is one example of a "lens hood." The spindle 23 is one example of a "spindle." Each of the grip parts 203, 204 is one example of a "grip part." Each of the power tool systems 5F, 5G is one example of a "power tool system."

It is noted that the power tool and the power tool system according to the present disclosure is not limited to the illustrative examples of the above-mentioned embodiments. For example, at least one among the nonlimiting modifications explained below can be used by combining the power tool illustrated by example in the above-mentioned embodiments, the power tool system illustrated by example in the above-mentioned embodiments, and at least one of the features recited in the claims.

For example, an impact tool, such as a power hammer, and a drill tool, such as a power drill or a hammer drill, can be given as other non-limiting examples of the power tool according to the present disclosure. In addition, as other non-limiting examples of an accessory that is mountable on a power tool in a detachable manner (an auxiliary handle, or a cover that at least partially covers a tool accessory mounted on the power tool in a detachable manner), the following examples can be given: (i) a dust-collection cover (shroud) for a grinder; and (ii) a dust-collecting attachment (dust-collection cap, dust cover, or the like) that is mounted on a hammer drill or a hammer and is configured to at least partially cover the periphery of a tool accessory (hammer bit, drill bit, and the like).

The configuration, location, and number of the cameras 11 can be modified as appropriate. For example, the camera 11 may be disposed in the interior of the tool main body instead of being mounted on the exterior of the tool main body of the power tool and may capture images of the object through an opening provided in the tool main body.

The shape, the raw material, or the like of the camera guard 15 can be modified as appropriate, as long as the camera guard 15 can protect the camera 11 from impacts. For example, the camera guard 15 may be formed entirely of an elastic body and may cover the periphery of the camera main body 110 and the lens 117. In addition, the camera guard 15 may be formed by a portion of the tool main body instead of being a member separate from the tool main body of the power tool.

The shape, the location, or the like of the lens hood 118 can be modified as appropriate, as long as the lens hood 118 can block light from a specific direction or specific directions in relation to the object. In addition, the lens hood 118 may be detachable from the lens 117 or may be rotatable around the optical axis of the lens 117 so as to be able to modify the direction in which light is blocked.

In the above-mentioned embodiment, the inference chip 13, which performs the inference (determination) process based on image data from the camera 11, is provided separately from the controller 25, which performs operation control of the various power tools, such as the grinder 2A. Nevertheless, for example, the CPU 251 of the controller 25 (or some other type of processor or processing circuit), which performs operation control of the power tool, may also perform the inference (determination) process based on the image data. Alternatively, the processor 131, which performs the inference process, may be installed on the same board as that of the CPU 251 instead of being installed on a chip separate from the CPU 251 of the controller 25. In these modified examples, the trained model and the program for the inference process should be stored in, for example, the nonvolatile memory 254 or a separate storage apparatus. In addition, the processor 131, which performs the inference process, does not necessarily have to be integrated with the camera 11 as in the above-mentioned embodiments and may be provided separately from the camera 11. The processor 131 and the camera 11 do not necessarily have to be in a one-to-one correspondence relationship as in the above-mentioned embodiments; for example, one processor 131 alone may process image data output from a plurality of cameras 11.

In the first embodiment, in the situation in which it has been determined that the side handle 71A is mounted on the tool main body 20A and is being gripped by the user, it is determined that the state of the side handle 71A is normal. Nevertheless, with regard to auxiliary handles like the side handles 71A, 71C, in the inference (determination) process based on image data, the state of the auxiliary handle may be determined in accordance with only whether the auxiliary handle is mounted on the tool main body of the power tool.

In the above-mentioned embodiments, the AI unit 10 is started in response to the controller 25 detecting the pressing of the AI-unit start switch 18 by the user or the AI-unit start sensor 19 detecting the gripping of the grip part 351 (main grip) by the user. Nevertheless, the AI unit 10 may be started in response to the power supply to the power tool being turned ON (i.e., in response to the battery 95 being mounted on the battery-mounting part 207 or in response to the power supply cord 29 being connected to the AC power supply). Alternatively, the AI unit 10 may be started in response to the main switch 214 being turned ON (i.e., in response to the trigger 213 being pressed).

Furthermore, the aspects below are constructed considering the gist of the present invention and the above-mentioned embodiments. Any one of or a plurality of the aspects below can be used in the configurations of the embodiments, the modified examples thereof, or in combination with the inventions recited in the claims.

First Aspect

The at least one accessory is the auxiliary handle and the cover; and the determining part is configured to determine that the state of the at least one accessory is normal in response to the determining part determining that the auxiliary handle and the cover are mounted on the power tool and the auxiliary handle is being gripped by the user.

Second Aspect

The at least one accessory is the cover; and the determining part is configured to determine that the state of the at least one accessory is normal in response to the determining part determining that the cover is mounted on the power tool.

Third Aspect

The chip is integrated with the at least one camera and constitutes one unit.

Fourth Aspect

The camera guard is formed at least partially of an elastic body.

Fifth Aspect

The at least one camera is disposed between the motor and the grip part in the longitudinal-axis direction of the tool main body.

Sixth Aspect

The control part is configured to report to the reporting unit the information indicating abnormal in response to the determining part determining that the state of the at least one accessory is not normal.

Seventh Aspect

The control part is configured to control the supply of electric power to the at least one camera and the determining part in accordance with the detection result produced by the detection part.

Eighth Aspect

The power tool is a grinder;

the at least one accessory is the auxiliary handle and the cover; and the determining part is configured to determine that the state of the auxiliary handle and the state of the cover are normal in response to at least the determination that the auxiliary handle and the cover are mounted on the power tool.

Ninth Aspect

The AI unit detects only the position of the user's hands on the power tool and stops the motor in case one or both hands is not properly holding, e.g., a handle or grip part. For example, if the power tool is a chain saw, one or more AI units may capture images of the two handles of the chain saw and determine whether the user's hands are properly holding both handles. If not, then the AI unit may output a signal that causes the chain saw motor to stop.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the AI unit and/or controller, is also understood as a corresponding method step or as a feature of a method step. In an analogous manner, aspects which have been described in the context of or as a method step also represent a description of a corresponding block or detail or feature of a corresponding device, such as the control unit.

Depending on certain implementation requirements, exemplary embodiments of the AI unit and/or controller of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

As was mentioned above, programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine-or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the AI unit and/or controller, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performance, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components.

Therefore, although some aspects of the control unit have been identified as "parts" or "steps", it is understood that such parts or steps need not be physically separate or distinct electrical components, but rather may be different blocks of program code that are executed by the same hardware component, e.g., one or more microprocessors.

EXPLANATION OF THE REFERENCE NUMBERS 2A, 2B, 2F, 2G Disc grinders (grinders)
20A, 20B Tool main bodies
201 Front-end part
202 Rear-end part
203 Grip part
204 Grip part
206 Handle-mounting part
207 Battery-mounting part
21 Motor
211 Output shaft
213 Trigger
214 Main switch
23 Spindle
231 Tool-mounting part
25 Controller
251 CPU
252 ROM
253 RAM
257 Drive circuit
254 Nonvolatile memory
27 Communications apparatus
29 Power supply cord
3C, 3D Hammer drills
30C, 30D Tool main bodies
301 First portion
302 Second portion
303 Third portion
304 Barrel part
31 Tool holder
33 Drive mechanism
35C, 35D Main handles
351 Grip part
4 Driver-drill
40 Tool main body
404 Barrel part
41 Chuck
43 Drive mechanism
45 Main handle
451 Grip part
455 Lower-end part
5F, 5G Power tool systems
50 Network
6 Information-processing unit
61 Arithmetic unit
63 Storage apparatus
65 Communications apparatus
71A, 71C Side handles
711 Grip part
713 Mounting part
715 Mounting part
81 Wheel cover
811 Mounting part
91 Tool accessory
92 Tool accessory
93 Tool accessory
95 Battery
10 AI unit
10A First unit
10B Second unit
11 Camera
110 Camera main body
111 Main-body case
113 Image-capturing device
117 Lens
118 Lens hood
13 Inference chip
131 Processor
133 Memory
15 Camera guard
150 Frame
151 Mounting plate
153 Side plate
155 Elastic body
17 Reporting unit
171 Red LED
173 Green LED
18 AI-unit start switch
19 AI-unit start sensor

The invention claimed is:

1. A power tool, on which at least one accessory is mountable in a detachable manner, comprising:
at least one camera; and
a determining part;
wherein:
the at least one accessory is at least one device selected from a detachable auxiliary handle and a detachable cover, which is configured to at least partially cover a tool accessory mounted on the power tool; and the determining part is configured to perform image processing on image data output from the at least one camera and to determine based on the image data whether the at least one accessory is mounted on the power tool and to determine whether the state of the at least one accessory is normal based on at least the determination of whether the at least one accessory is mounted on the power tool.

2. The power tool according to claim 1, wherein the determining part is configured to infer the state of the at least one accessory by inputting the image data into a trained model obtained by machine learning and to determine whether the state of the at least one accessory is normal.

3. The power tool according to claim 2, wherein:
the determining part is at least one processor; and
the at least one processor together with memory, which stores the trained model, are configured as one chip.

4. The power tool according to claim 1, further comprising:
a tool main body;
a motor, which is housed in the tool main body;
a manipulatable member configured to be manually operated by a user;
a main switch configured to turn ON in response to manual manipulation of the manipulatable member; and
a control part configured to control the operation of the power tool based on the state of the main switch and a determination result output by the determining part;
wherein the control part is configured to start the drive of the motor only when the main switch is ON and the determining part has determined that the state of the at least one accessory is normal.

5. The power tool according to claim 4, wherein:
the determining part is configured to periodically determine, during drive of the motor, whether the state of the at least one accessory is normal; and
the control part is configured to stop the drive of the motor or reduce the rotational speed of the motor during drive of the motor in response to the determining part having determined that the state of the at least one accessory is not normal.

6. The power tool according to claim 4, wherein the determining part and the control part are separate processors that are wire connected or wirelessly connected to each other.

7. The power tool according claim 1, further comprising a reporting unit configured to report information indicating abnormal in response to the determining part having determined that the state of the at least one accessory is not normal.

8. The power tool according to claim 1, comprising:
a detection part configured to detect a prescribed operation of the user;
wherein the at least one camera and the determining part are configured to start in response to the detection part detecting the prescribed operation.

9. The power tool according to claim 1, wherein:
the at least one accessory is the auxiliary handle;
the determining part is configured to determine that the state of the at least one accessory is normal in response to the determining part determining that the auxiliary handle is mounted on the power tool and the auxiliary handle is being gripped by the user.

10. The power tool according to claim 1, wherein the at least one camera and the determining part are connected to each other by wire.

11. The power tool according to claim 1, further comprising a camera guard, which at least partially covers the at least one camera.

12. The power tool according to claim 1, further comprising a lens hood configured to block light that enters a lens of the at least one camera from one or more specific directions.

13. The power tool according to claim 1, wherein:
the power tool is a grinder and comprises: (i) a spindle that is configured to be operably coupled to the motor and to be rotated, by the rotational power of the motor, around an axis extending in a direction orthogonal to a rotational axis of the motor; and (ii) a tool main body, which houses the motor and the spindle and is elongate extending along the rotational axis of the motor; and
the at least one camera is disposed on the side opposite the spindle relative to the motor in a longitudinal-axis direction of the tool main body.

14. The power tool according to claim 13, wherein:
the tool main body comprises a grip part configured to be gripped by the user; and
the at least one camera is disposed at a portion of the tool main body other than the grip part.

15. The power tool according to claim 13, wherein:
the at least one accessory includes both the auxiliary handle and the cover; and
the at least one camera is only one camera and is disposed at a location where the camera captures an image of both the auxiliary handle and the cover.

16. The power tool according to claim 1, wherein the at least one camera is at a location that is offset from a drive axis of the tool accessory.

17. The power tool according to claim 1, wherein:
the at least one camera is disposed in or on a housing of the power tool at a location where the detachable auxiliary handle and/or the detachable cover would be within an image-capturing range of the at least one camera; and
the determining part is configured to determine whether the detachable auxiliary handle and/or the detachable cover is mounted on the power tool by performing image analysis on the image captured by the at least one camera.

18. A power tool, on which at least one accessory is mountable in a detachable manner, comprising:
a plurality of mounting locations, at which the at least one accessory is mountable, defined on the power tool;
only one camera disposed at a location on the power tool where the camera captures an image of the at least one accessory when the at least one accessory has been mounted at any of the plurality of mounting locations; and
a determining part;
wherein:
the at least one accessory is at least one selected from a detachable auxiliary handle and a detachable cover, which is configured to at least partially cover a tool accessory mounted on the power tool; and
the determining part is configured to perform image processing on image data output from the at least one camera and to determine based on the image data whether the at least one accessory is mounted on the power tool and to determine whether the state of the at least one accessory is normal based on at least the determination of whether the at least one accessory is mounted on the power tool.

19. A power tool system comprising:
- a power tool on which at least one accessory is mountable in a detachable manner and that comprises at least one camera; and
- a determining part configured to infer the state of the at least one accessory and determine whether the state of the at least one accessory is normal by inputting, into a trained model obtained by machine learning, image data of an image captured by the at least one camera.

20. The power tool system according to claim 19, wherein:
- the at least one camera is disposed in or on a housing of the power tool at a location where the at least one accessory would be within an image-capturing range of the at least one camera;
- the at least one accessory is a detachable auxiliary handle or a detachable cover, which at least partially covers a tool accessory mounted on the power tool; and
- the determining part is configured to determine whether the detachable auxiliary handle or the detachable cover is mounted on the power tool by performing image analysis using the trained model on the image captured by the at least one camera.

* * * * *